US009015773B2

(12) United States Patent
Kim

(10) Patent No.: US 9,015,773 B2
(45) Date of Patent: Apr. 21, 2015

(54) METHOD FOR TRANSMITTING AND RECEIVING A BROADCAST SIGNAL AND A BROADCAST RECEIVER USING THE METHOD

(75) Inventor: Kwansuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 13/510,219

(22) PCT Filed: Nov. 4, 2010

(86) PCT No.: PCT/KR2010/007738
§ 371 (c)(1),
(2), (4) Date: Feb. 5, 2013

(87) PCT Pub. No.: WO2011/062386
PCT Pub. Date: May 26, 2011

(65) Prior Publication Data
US 2013/0133014 A1    May 23, 2013

Related U.S. Application Data

(60) Provisional application No. 61/262,160, filed on Nov. 18, 2009.

(51) Int. Cl.
*H04N 7/20* (2006.01)
*H04N 21/472* (2011.01)
*H04H 60/73* (2008.01)
*H04N 21/4147* (2011.01)
(Continued)

(52) U.S. Cl.
CPC .......... *H04N 21/472* (2013.01); *H04H 20/106* (2013.01); *H04H 60/06* (2013.01); *H04H 60/73* (2013.01); *H04H 2201/40* (2013.01); *H04N 21/4147* (2013.01); *H04N 21/4263* (2013.01); *H04N 21/4345* (2013.01); *H04N 21/64322* (2013.01); *H04N 21/64707* (2013.01); *H04N 21/8133* (2013.01); *H04N 21/25* (2013.01)

(58) Field of Classification Search
CPC .......... H04N 21/262; H04N 21/26283; H04N 21/4622; H04N 21/47214; H04N 21/472; H04N 21/482
See application file for complete search history.

(56) References Cited

U.S. PATENT DOCUMENTS 7,071,993 B2 *  7/2006  Kim .............................. 348/465
8,132,212 B2 *  3/2012  Huegel .......................... 725/61
(Continued)

FOREIGN PATENT DOCUMENTS

EP         1143649 A2      10/2001
KR     10-2009-0021110      2/2009
KR     10-2009-0079838      7/2009

*Primary Examiner* — Pankaj Kumar
*Assistant Examiner* — Timothy Newlin
(74) *Attorney, Agent, or Firm* — Mckenna Long & Aldridge LLP

(57) ABSTRACT

The present invention relates to a method and apparatus for transmitting and receiving a broadcast signal. The method for receiving a broadcast signal comprises: generating a broadcast stream including at least one program; generating first program table information that represents the broadcast stream; receiving non-real time (NRT) service schedule information; generating second program table information that represents the NRT service, in accordance with the received NRT service schedule information; configuring a stream including the broadcast stream, the 1st program table information and the second program table information; and transmitting the stream.

17 Claims, 21 Drawing Sheets

(51) Int. Cl.
*H04N 21/426* (2011.01)
*H04N 21/434* (2011.01)
*H04N 21/643* (2011.01)
*H04N 21/647* (2011.01)
*H04N 21/81* (2011.01)
*H04N 21/25* (2011.01)
H04H 20/10 (2008.01)
H04H 60/06 (2008.01)

(56) References Cited

U.S. PATENT DOCUMENTS

| | | | |
|---|---|---|---|
| 8,453,182 B2 * | 5/2013 | Lee et al. | 725/61 |
| 2001/0006404 A1 * | 7/2001 | Yun | 348/553 |
| 2002/0194607 A1 | 12/2002 | Connelly | |
| 2003/0005447 A1 * | 1/2003 | Rodriguez | 725/51 |
| 2003/0163812 A1 * | 8/2003 | Tsukamoto et al. | 725/39 |
| 2005/0166227 A1 * | 7/2005 | Joshi | 725/38 |
| 2005/0183133 A1 | 8/2005 | Kelly | |
| 2005/0193425 A1 * | 9/2005 | Sull et al. | 725/135 |
| 2006/0023755 A1 * | 2/2006 | Tatsumi et al. | 370/535 |
| 2006/0218586 A1 * | 9/2006 | Pohjolainen et al. | 725/39 |
| 2009/0013356 A1 * | 1/2009 | Doerr et al. | 725/62 |
| 2009/0100475 A1 * | 4/2009 | Sharifi | 725/62 |
| 2009/0144768 A1 * | 6/2009 | Nagaraja | 725/39 |
| 2009/0193467 A1 * | 7/2009 | Rodriguez | 725/47 |
| 2009/0276819 A1 * | 11/2009 | Kim et al. | 725/105 |
| 2010/0169910 A1 * | 7/2010 | Collins et al. | 725/14 |
| 2010/0186025 A1 * | 7/2010 | Thomas et al. | 725/5 |
| 2010/0281510 A1 * | 11/2010 | Bichot et al. | 725/114 |
| 2011/0004904 A1 * | 1/2011 | Green et al. | 725/40 |
| 2011/0122834 A1 * | 5/2011 | Walker et al. | 370/329 |
| 2012/0304228 A1 * | 11/2012 | Drazin et al. | 725/40 |
| 2013/0111527 A1 * | 5/2013 | Poniatowski et al. | 725/58 |
| 2013/0133014 A1 * | 5/2013 | Kim | 725/86 |

* cited by examiner

FIG.6

| Syntax | Bits | Format |
|---|---|---|
| terrestrial_virtual_channel_table_section () { | | |
|     table_id | 8 | 0xC8 |
|     section_syntax_indicator | 1 | '1' |
|     private_indicator | 1 | '1' |
|     zero | 2 | '00' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_section;i++) { | | |
|         short_name | 7*16 | unicode™ BMP |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 6 | '111111' |
|         service_type | 6 | uimsbf |
|         source_id | 16 | uimsbf |
|         reserved | 6 | '111111' |
|         descriptors_length | 10 | uimsbf |
|         for (i=0;i<N;i++) { | | |
|             descriptors() | | |
|         } | | |
|     } | | |
|     reserved | 6 | '111111' |
|     additional_descriptors_length | 10 | uimsbf |
|     for(j=0; j<N;j++) { | | |
|         additional_descriptors() | | |
|     } | | |
|     CRC_32 | 32 | rpchof |
| } | | |

FIG.7

| Syntax | Bits | Format |
|---|---|---|
| event_information_table_section () { | | |
|     table_id | 8 | 0xCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     zero | 2 | '00' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     num_events_in_section | 8 | uimsbf |
|     for (j = 0; j< num_events_in_section;j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i=0;i<N;i++) { | | |
|             descriptor() | | |
|         } | | |
|     } | | |
|     CRC_32 | 32 | rpchof |
| } | | |

FIG.8

FIG.11

| Syntax | No. Bits | Format |
|---|---|---|
| Service_map_table_MH_section () { | | |
|     table_id | 8 | 0xBD |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_MH_protocol_version | 8 | uimsbf |
|         ensemble_id | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_MH_services | 8 | uimsbf |
|     for (i=0; i< num_MH_services; i++) | | |
|     { | | |
|         MH_service_id | 16 | uimsbf |
|         multi_ensemble_service | 2 | uimsbf |
|         MH_service_status | 2 | uimsbf |
|         SP_Indicator | 1 | bslbf |
|         short_MH_service_name_length  /* m */ | 3 | uimsbf |
|         short_MH_service_name | 16*m | |
|         reserved | 2 | '11' |
|         MH_service_category | 6 | uimsbf |
|         num_components | 5 | uimsbf |
|         IP_version_flag | 1 | bslbf |
|         source_IP_address_flag | 1 | bslbf |
|         MH_service_destination_IP_address_flag | 1 | bslbf |
|         if (source_IP_addres_flag) | | '11' |
|             source_IP_address | 32 or 128 | uimsbf |
|         if (MH_service_destination_IP_address_flag) | | |
|             MH_service_destination_IP_address | 32 or 128 | uimsbf |

FIG.12

| | | |
|---|---|---|
| for (j=0; j<num_components; j++) | | |
| { | | |
|     reserved | 1 | '1' |
|     essential_component_indicator | 1 | bslbf |
|     component_destination_IP_address_flag | 1 | bslbf |
|     port_num_count | 5 | uimsbf |
|     component_destination_UDP_port_num | 16 | uimsbf |
|     if (component_destination_IP_address_flag) | | |
|         component_destination_IP_address | 32 or 128 | uimsbf |
|     reserved | | |
|     num_component_level_descriptors | 4 | '1111' |
|     for (k=0; k<num_component_level_descriptors; k++) | 4 | uimsbf |
|     { | | |
|         component_level_descriptor() | var | |
|     } | | |
| } | | |
| reserved | 4 | '1111' |
| num_MH_service_level_descriptors | 4 | uimsbf |
| for (m=0; m<num_MH_service_level_descriptors; m++) | | |
| { | | |
|     MH_service_level_descriptor() | var | |
| } | | |
| } | | |
| reserved | 4 | '1111' |
| num_ensemble_level_descriptors | 4 | uimsbf |
| for (n=0; n<num_ensemble_level_descriptors; n++) | | |
| { | | |
|     ensemble_level_descriptor() | var | |
| } | | |
| } | | |

FIG.13

| Syntax | No. Bits | Format |
|---|---|---|
| NRT_information_table_section(){ | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     NRT_IT_version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     time_span_start | 32 | uimsbf |
|     reserved | 5 | '11111' |
|     time_span_length | 11 | uimsbf |
|     num_items_in_section | 8 | uimsbf |
|     for (j=0; j< num_items_in_section; j++) { | | |
|         content_linkage | 32 | uimsbf |
|         updates_available | 1 | bslbf |
|         TF_available | 1 | bslbf |
|         low_latency | 1 | bslbf |
|         content_length_included | 1 | bslbf |
|         playback_length_in_seconds | 20 | uimsbf |
|         if (content_length_included==1) { | | |
|             content_length | 40 | uimsbf |
|         } | | |
|         playback_delay_included | 1 | bslbf |
|         expiration_included | 1 | bslbf |
|         reserved | 2 | '11' |
|         duration | 12 | uimsbf |
|         if (playback_delay_included==1) { | | |
|             reserved | 4 | '1111' |
|             playback_delay | 20 | uimsbf |
|         } | | |
|         if (expiration_included==1) { | | |
|             expiration | 32 | uimsbf |
|         } | | |
|         content_name_length | 8 | uimsbf |
|         content_name_text() | var | |
|         reserved | 4 | '1111' |
|         content_descriptors_length | 12 | uimsbf |
|         for (i=0; i<N; i++) { | | |
|             content_descriptor() | | |
|         } | | |
|     } | | |
|     reserved | 6 | '111111' |
|     descriptors_length | 10 | uimsbf |
|     for (i=0; i<M; i++) { | | |
|         descriptor() | | |
|     } | | |
| } | | |

| Syntax | Bits | Format |
|---|---|---|
| broadcast_information_descriptor () { | | |
|    descriptor_tag | 8 | 0xe9 |
|    descriptor_length | 8 | uimsbf |
|    broadcaster_id | 32 | uimsbf |
|    station_id | 32 | uimsbf |
| } | | |

FIG.18

| DTV RECEIVER (IP) | REQUESTED CONTENT | DOWNLOAD REQUEST TIME SLOT | TV STATION |
|---|---|---|---|
| 192.168.0.1 | Heroes 1-1 | 00:00 | 100 |
| 192.168.10.5 | Heroes 1-1 | 00:00 | 100 |
| 192.168.5.3 | Heroes 1-1 | 00:00 | 100 |
| 192.168.12.3 | 24 1-1 | 00:00 | 200 |
| 192.168.20.5 | 24 1-1 | 00:00 | 200 |
| 192.168.8.2 | 24 1-1 | 01:00 | 200 |
| 192.168.9.3 | 24 1-1 | 01:00 | 200 |
| 192.168.9.25 | Heroes 2-5 | 01:00 | 200 |
| 192.168.3.75 | 24 5-1 | 01:00 | 100 |
| 192.168.9.25 | Heroes 2-5 | 01:00 | 100 |
| 192.168.9.21 | Heroes 2-5 | 01:00 | 100 |

FIG.19

| TV STATION 100 | |
|---|---|
| BROADCAST TIME SLOT | CONTENT |
| 00:00 | Heroes 1-1 |
| 01:00 | Heroes 2-5 |

(a)

| TV STATION 200 | |
|---|---|
| BROADCAST TIME SLOT | CONTENT |
| 00:00 | 24 1-1 |
| 01:00 | 24 1-1 |

```
<script>
function getState(serviceId, contentId, fileName)
{
  var retValue;
  var NRTInstance = new NRTFile();
  NRTInstance.serviceId = serviceId;
  NRTInstance.contentId = contentId;
  NRTInstance.fileName = fileName;
  if ( NRTInstance.isValid() == false )
    retValue = "No NRT Info";
  else
  {
    var chunks = NRTInstance.getDownloadedChunk();
    if ( chunks.length == 1 && chunks[0].size == FileSize )
      retValue = "All Downloaded";
    else ( chunks.length > 0 )
      retValue = "Downloading";
    else
      retValue = "Not Downloaded";
  } return retValue;
}
</script>
```

FIG.25
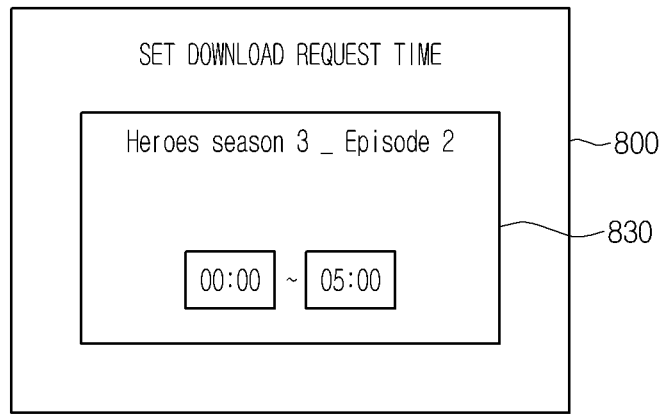
FIG.26
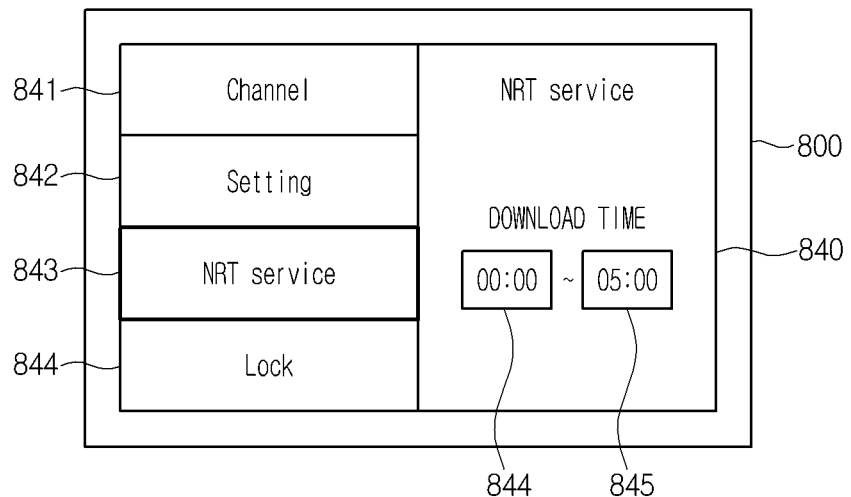
FIG.27
| Non-Real Time Information Table (NRT IT) |
|---|
| List of Contents Items: |
| Content0: |
| Heroes Season 3 _ Episode 2 |
| Content1: |
| Heroes Season 3 _ Episode 3 |
| Content2: |
| Heroes Season 3 _ Episode 4 |

METHOD FOR TRANSMITTING AND RECEIVING A BROADCAST SIGNAL AND A BROADCAST RECEIVER USING THE METHOD

This application claims the benefit of priority of PCT Application No. PCT/KR2010/007738 filed on Nov. 4, 2010 which claims the benefit of priority of U.S. Provisional Application No. 61/262,160 filed on Nov. 18, 2009, all of which are incorporated by reference in their entirety herein.

TECHNICAL FIELD

The present disclosure relates to a method and device of transceiving a broadcast signal.

BACKGROUND ART

A digital TV may provide various additional services in addition to video and audio as its original function, and for example, may select a program that a user wants through metadata representing program broadcasting airtime.

In the case of Advanced Television System Committee (ATSC) digital broadcasting, program information is delivered using the Program and System Information Protocol (PSIP) standard, and the digital TV interprets the delivered program information and displays an Electronic Program Guide (EPG) on the screen for user's easy selection.

Moreover, a digital TV service is being widely used via a wire/wireless communication network. The digital TV service provides various services that a related art analog broadcasting service couldn't provide.

DISCLOSURE OF THE INVENTION

Technical Problem

Embodiments provide a method and device for transceiving a broadcast signal, which may efficiently deliver Non-Real Time service.

Technical Solution

In one embodiment, a method of transmitting a broadcast signal includes: generating a broadcast stream including at least one program and first program table information representing the broadcast stream; receiving Non-Real Time (NRT) service schedule information; generating second program table information representing the NRT service according to the received NRT service schedule information; constituting a stream including the broadcast stream, the first program table information, and the second program table information; and transmitting the constituted stream.

In another embodiment, a method of receiving a broadcast signal includes: extracting a broadcast stream including at least one program and first program table information representing the broadcast stream, from the broadcast signal; obtaining TV station information from the extracted first program table information; receiving an NRT content list provided through NRT service; and transmitting request information on at least one content in the NRT content list in addition to the obtained TV station information.

In further another embodiment, a device for receiving a broadcast signal includes: a receiver for receiving the broadcast signal; a demodulator for demodulating the received broadcast signal; a demultiplexer for extracting a broadcast stream including at least one program, first program table information representing the broadcast stream, and second program table information representing NRT service, from the demodulated broadcast signal; a controller for obtaining TV station information from the extracted first program table information; and a network interface unit for receiving an NRT content list provided through NRT service, from a broadcaster server, and transmitting request information on at least one content in the NRT content list in addition to the obtained TV station information to the broadcaster server.

In still further another embodiment, a method of receiving a broadcast signal includes: receiving a broadcast signal from a TV station; extracting a broadcast stream including at least one program, first program table information representing the broadcast stream, and second program table information representing NRT service; receiving an NRT content list provided through NRT service from a broadcaster server; displaying information on a plurality of contents in the NRT content list; receiving a request for at least one among the displayed contents; and transmitting request information on the content in addition to TV station information obtained from the first program table information to the broadcaster server.

Advantageous Effects

According to an embodiment, a Non-Real time service schedule such as Video On Demand (VOD) may be determined according to user preference, so that appropriate NRT service may be provided to users by using less bandwidth and server capacity.

BRIEF DESCRIPTION OF THE DRAWINGS

FIG. 6 is a view illustrating a syntax structure of a Virtual Channel Table (VCT) shown in FIG. 5.

FIG. 7 is a view illustrating a syntax structure of an Event Information Table (EIT) shown in FIG. 5 according to an embodiment.

FIG. 8 is a view illustrating a data allocation method of a broadcast channel according to an embodiment.

FIGS. 11 and 12 are views illustrating a syntax structure of a Service Map Table (SMT) shown in FIG. 10 according to an embodiment.

FIG. 13 is a view illustrating a syntax structure of a Non-Real-Time Information Table (NRT IT) shown in FIG. 10 according to an embodiment.

FIG. 18 is a view illustrating information transmitted to a broadcaster server according to an embodiment.

FIG. 19 is a view illustrating an NRT service schedule determined based on the information of FIG. 18 according to an embodiment.

FIG. 20 is a view illustrating a script for providing NRT service according to an embodiment.

FIGS. 25 and 26 are views illustrating a method of setting a download request time of a content according to embodiments FIG. 27 is a view illustrating a configuration of an NRT IT according to an embodiment.

MODE FOR CARRYING OUT THE INVENTION

Figure 1:
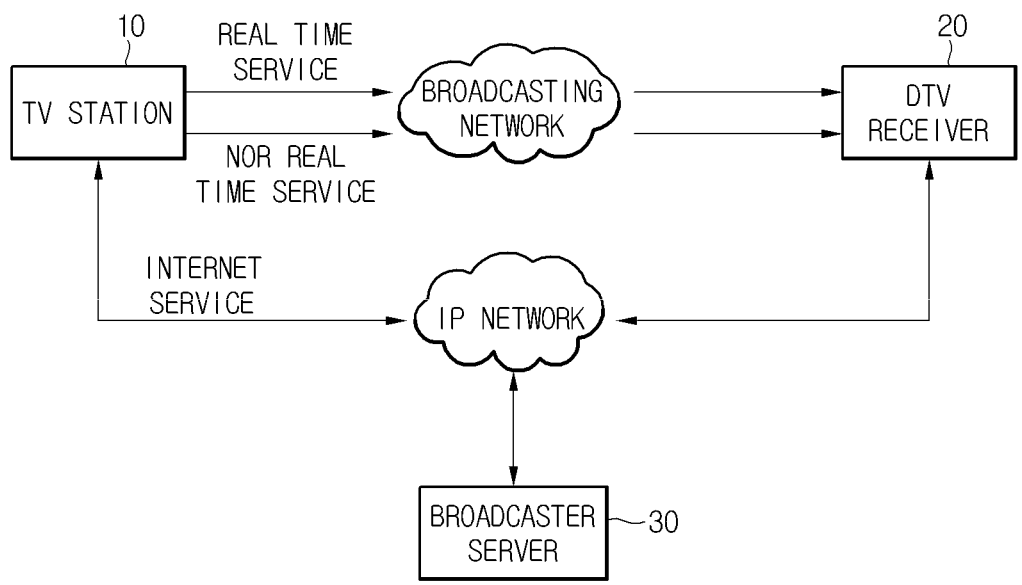
FIG. 1 is a conceptual view illustrating a broadcasting service according to an embodiment.

FIG. 1 is a conceptual view illustrating a broadcasting service according to an embodiment.

Referring to FIG. 1, a TV station 10 may provide Real-Time (RT) service and Non-Real-Time (NRT) service to a DTV receiver 20 via a network.

For example, the TV station 10 generates a broadcast signal for Real Time (RT) service according to the Advanced Television Systems Committee (ATSC) adaptive digital broadcasting standard, and then, transmits it to the DTV receiver 20 via a broadcasting network. However, the RT service according to the present invention is not limited to the ATSC standard, and may be transmitted and received through various broadcasting communication standards.

The Non Real Time (NRT) service is a streaming service with which video and audio contents are streamed from the TV station 10 to the DTV receiver 20 at a slower speed or a faster speed (or a combination speed thereof) than an RT speed, and may perform an NRT transmitting, storing, or viewing operation, not an RT streaming operation.

The TV station 10 may transmit the RT service or the NRT service via the same or different channel, and for example, may transmit the RT service, and then, transmit the NRT service using a remaining bandwidth after the RT service transmission or an exclusive bandwidth.

Through the NRT service, the TV station 10 may provide a service including various contents such as news clip, weather information, Video On Demand (VOD), or targeted advertising.

A VOD service uses a one-to-one connected bi-directional communication channel, and when a user sends a request for viewing a specific vide content, a user delivers a corresponding video content, and then, a DTV receiver 20 at a user side plays the delivered content.

In this case, since each DTV receiver 20 receives VOD service from the server through different communication channels, the load applied to the server side is proportional to the number of users, and accordingly, it is required to expand a transmission line and server corresponding to the number of users in order to provide VOD service to a plurality of users.

Therefore, Push VOD service is provided by using one-to-many Non-Real Time service via the broadcasting network so that the load applied to a server may be reduced.

In the case of Push VOD using Non-Real Time service, when content is transmitted according to a predetermined schedule, the DTV receiver 20 at a user side may selectively play or record the transmitted content.

For this, the TV station 10 transmits a broadcasting schedule of Non-Real time service such a the push VOD to the DTV receiver 20 via a broadcasting network, and a user may set a content to be downloaded after looking at the broadcasting schedule displayed on the DTV receiver 20.

Accordingly, the DTV receiver 20 downloads a Non-Real Time video content from the TV station 10 when it comes the set download time, and stores the downloaded content in a large capacity storage medium (not shown). Then, a user may play the downloaded content through the DTV receiver 20.

In this case, since all DTV receivers 20 receive content via one communication channel, i.e., broadcasting network, it is unnecessary to expand a transmission line or server at a side for providing service than the VOD.

However, in the case of the Non-Real Time service, since it is impossible to accurately predict a content that users want to watch, a corresponding line itself may be wasted when users do not receive contents transmitted via Non-Real Time service.

According to an embodiment, a Non-Real time service schedule may be determined according to user preference, and the TV station 10 may provide Non-Real Time service such as push VOD according to the determined Non-Real Time service schedule.

For example, the TV station 10 transmits information on itself to the DTV receiver 20 via a broadcasting network, and a broadcaster server 30 transmits a content list of Non-Real Time service to the DTV receiver 20 via an IP network.

A user of the DTV receiver 20 selects a content (or a keyword or genre) to be viewed or downloaded from the received Non-Real Time content list, and then, selects a time slot that the content is to be downloaded.

Then, the DTV receiver 20 may transmit information on the selected content and download time to the broadcaster server 30 via an IP network, in addition to the information on a TV station received from the TV station 10, for example, a broadcaster ID and TV station ID.

The broadcaster server 30 combines content request information and information on a TV station received from a plurality of DTV receivers 20, and then determines a Non-Real Time service schedule for each TV station according to user preference to provide it to the TV station 10.

The TV station 10 transmits the Non-Real Time service schedule from the broadcaster server 30 to each DTV receiver 20, and broadcasts a content according to the schedule via Non-Real Time service.

Additionally, a user of the DTV receiver 20 confirms the Non-Real Time service schedule and then selects a content to be downloaded. Thus, the selected content is downloaded according to the scheduled time, and then played.

As mentioned above, since a schedule of Non-Real Time service such as push VOD is determined according to content preferences of users, Non-Real Time service may be efficiently provided using less transmission line and server.

Figure 2:
FIG. 2 is a block diagram illustrating a configuration of a broadcast transmitting device according to an embodiment.

FIG. 2 is a block diagram illustrating a configuration of a broadcast transmitting device. The broadcast transmitting device may include a program encoder 100, a PSI and PSIP generator 110, a transport multiplexer 120, a modulator 130, and a DTV transmitter 140.

Referring to FIG. 2, the program encoder 100 may include a video encoder 101, an audio encoder 102, and a SP transport multiplexer 103, and may output a single program transport stream (SP TS) corresponding to one program.

The video encoder 101 receives a video signal of a corresponding program and encodes the video signal through a specific compression, for example, an MPEG-2 compression algorithm, and then outputs the encoded video signal to the SP transport multiplexer 103.

Furthermore, the audio encoder 102 encodes an audio signal of the program by using a specific compression, for example, an AC-3 compression algorithm, and then outputs the encoded audio signal to the SP transport multiplexer 103.

The SP transport multiplexer 103 multiplexes video data encoded by the video encoder 101, audio data encoded by the audio encoder 102, information on a corresponding program, and related data to generate a SP TS.

The PSI and PSIP generator 110 may generate program information including Program Specific Information (PSI) and a Program and System Information Protocol (PSIP).

The PSI may include a Program Association Table (PAT), a Program Map Table (PMT), a Network Information Table (NIT), and a Conditional Access Table (CAT). The PSIP may include a System Time Table (STT), a Master Guide Table (MGT), a Virtual Channel Table (VCT), a Rating Region Table (RRT), an Event Information Table (EIT), and an Extended Text Table (ETT).

The PSI and PSIP generator 110 may further generate information on contents provided through the NRT service or information on contents provided through the internet service.

For example, the PSI and PSIP generator 110 may output a PMT among the generated tables to the ST transport multiplexer 103, and may output the PAT and PSIP data to the transport multiplexer 120.

Tables generated by the PSI and PSIP generator 110 may have a configuration according to the ATSC adaptive digital broadcasting standard, and this will be described in detail below.

Moreover, the broadcast transmitting device according to an embodiment may include a plurality of program encoders 100, and a plurality of SP TSs.

The SP transport multiplexer 120 multiplexes the SP TSs inputted from the plurality of program encoders 100 and program information inputted from the PSI and PSIP generator 110, for example, the PAT and PSIP data, to generate a Multi Program (MP) TS.

The modulator 130 modulates the MP TS inputted from the transport multiplexer 120, and outputs it. For example, the modulation method may use an 8-Vestigial Side Band (VSB) according to the ATSC standard. Moreover, the broadcast transmitting device may further include a channel coder.

The DTV transmitter 140 transmits the MP TS outputted from the modulator 130 through a specific frequency band. For example, the DTV transmitter 140 may transmit the MP TS through a 6 MHz RF channel.

The configuration of the broadcast transmitting device according to an embodiment is described with reference to FIG. 2, but the present invention is not limited thereto. Therefore, at least one of components shown in FIG. 2 may be omitted, or an additional component may be further included, if necessary.

For example, moreover, the broadcast transmitting device may further include components for transmitting a broadcast signal through the NRT service or internet service.

Figure 3:
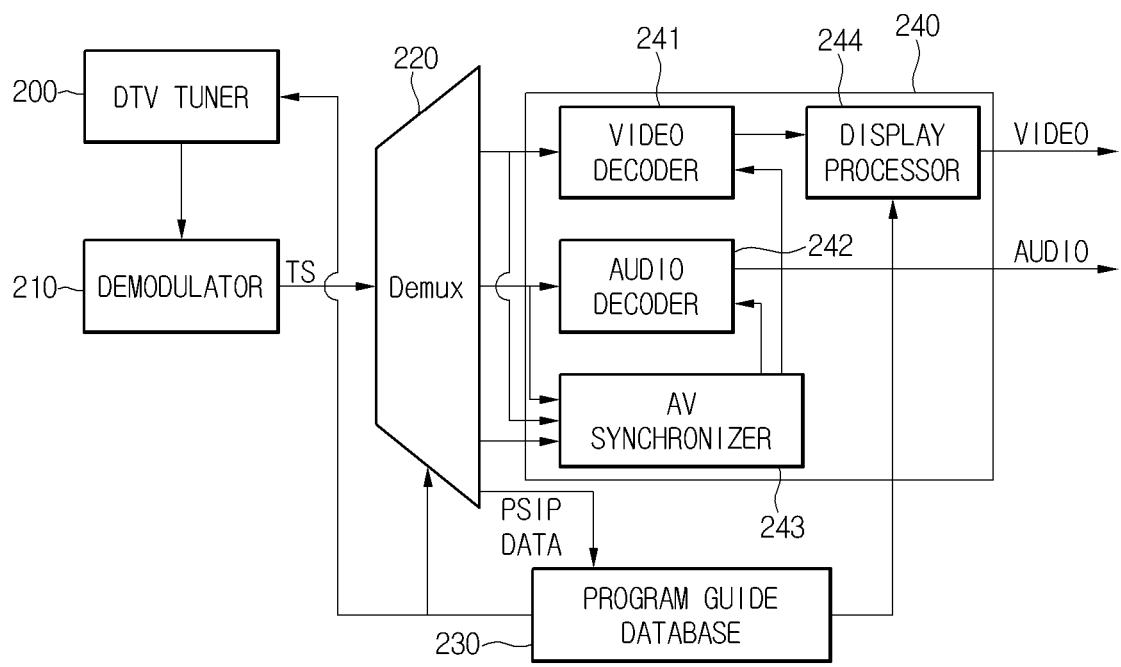
FIG. 3 is a block diagram illustrating a configuration of a broadcast receiving device according to an embodiment.

FIG. 3 is a block diagram illustrating a configuration of a broadcast receiving device. The broadcasting receiving device may obtain a video signal and an audio signal from a broadcast signal received from an external by inversely performing the operations of the broadcast transmitting device described with reference to FIG. 2.

Referring to FIG. 3, the DTV tuner 200 may down-convert a broadcast signal received via a frequency of a specific physical transport channel through an antenna or cable into an Intermediate Frequency (IF) corresponding to a channel that a user selects, and then, may output the down-converted broadcast signal to a demodulator 210.

The demodulator 210 may demodulate a signal outputted from a tuner through a specific modulation, for example, the 8-VSB modulation, and then may output a TS of an actual bit string.

A demultiplexer 220 may demultiplex the TS inputted from the demodulator 210 to extract video stream and audio stream, and for example, may demultiplex the TS into an MEPG-2 bit stream and AC-3 bit stream.

The demultiplexer 220 may separate program information such as the PSI and PSIP from the TS in order to extract it.

Furthermore, the demultiplexer 220 may output the extracted program information, for example, PSIP data, to the program guide database 230.

Moreover, the TS may further include information on contents received through the NRT service or internet service, and accordingly, the demultiplexer 220 may extract the content information from the TS.

A program decoder 240 may decode the video stream and audio stream inputted from the demultiplexer 220 to output video and audio signals in a playback available format, and for this, may further include a video decoder 241, an audio decoder 242, and an AV synchronizer 243, and a display processor 244.

The video decoder 241 decodes a video stream inputted from the demultiplexer 220 through a specific compression, for example, an MPEG-2 compression algorithm, and then outputs the decoded video stream to the display processor 244. Then, the display processor 244 may convert the inputted video signal into displayable various formats for output.

Moreover, the audio decoder 242 may decode the inputted audio stream through a specific compression, for example, an AC-3 compression algorithm, and then, may output the decoded audio stream.

The AV synchronizer may synchronize the video signal with the audio signal, which are decoded by the video decoder 241 and the audio decoder 242, respectively, by using PCR's from the demultiplexer 220 and time stamps from the video stream.

The configuration of the broadcast receiving device according to an embodiment is described with reference to FIG. 3, but the present invention is not limited thereto. Therefore, at least one of components shown in FIG. 3 may be omitted, or an additional component may be further included, if necessary.

For example, moreover, the broadcast receiving device may further include components for receiving a broadcast signal through the NRT service or internet service and processing the received broadcast signal.

In more detail, the broadcast receiving device may further include a network interface unit (not shown) for receiving contents through internet service, a display unit (not shown) for playing a video signal outputted from the program decoder 240, or an audio outputting unit (not shown) for outputting the audio signal.

Hereinafter, a method and device of transmitting a broadcast signal according to an embodiment will be described with reference to FIGS. 4 to 14.

Figure 4:
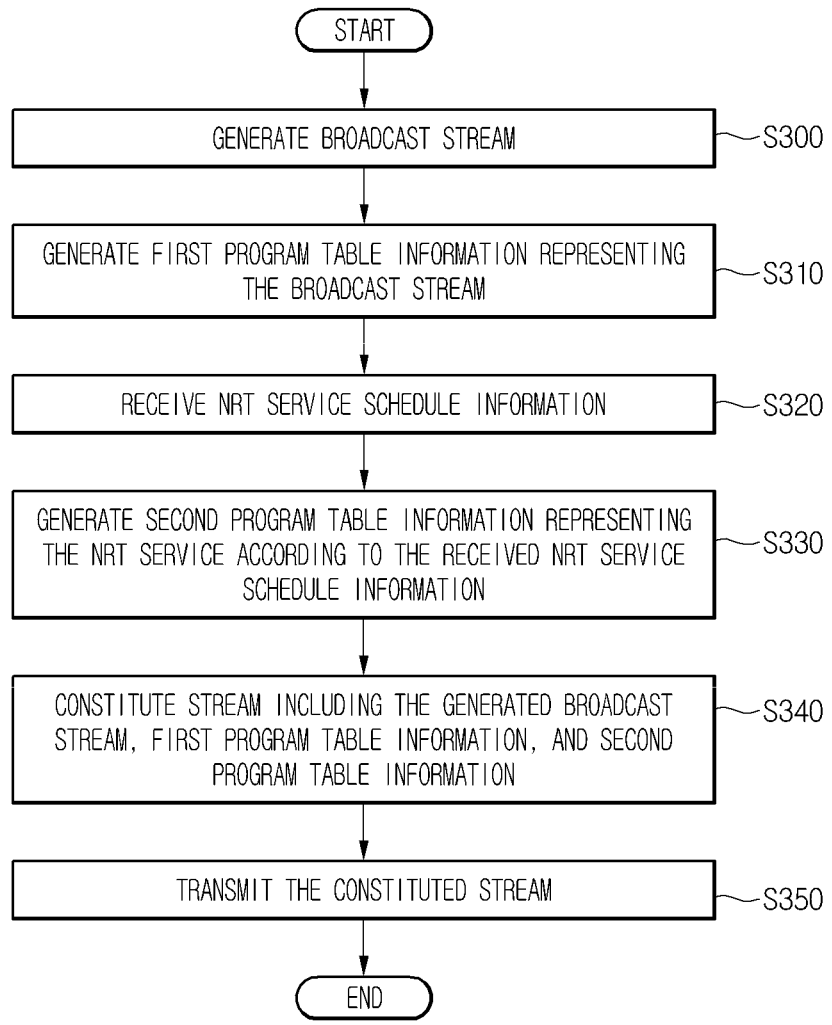
FIG. 4 is a flowchart illustrating a broadcast signal transmitting method according to an embodiment.

FIG. 4 is a flowchart illustrating a method of transmitting a broadcast signal according to an embodiment, and overlapping contents described with reference to FIGS. 1 to 3 will be omitted.

Referring to FIG. 4, a broadcast transmitting device generates a broadcast stream in operation S300, and generates first program table information representing the broadcast stream in operation S310.

For example, the program encoder 100 in FIG. 2, in more detail, the video encoder 101 and the audio encoder 102, may generate and output a broadcast stream including video data and audio data.

The program table information may include tables according to PSI or PSIP generated by the PSI and PSIP generator 110, and an embodiment relating to the program table information on RT content, i.e., a program provided through RT service, will be described in detail with reference to FIGS. 5 to 7.

The broadcast transmitting device receives NRT service schedule information in operation S320, and generates second program table information representing the NRT service according to the received NRT service schedule information in operation S330.

For example, the broadcast receiving device may be the TV station 10 shown in FIG. 1, and the TV station 10 may receive NRT service schedule information determined according to user preference from the broadcaster server 30.

Additionally, the second program table information may include information on NRT content, i.e., a program provided through NRT service, and its embodiment will be described in detail with reference to FIGS. 9 to 13.

Additionally, the first and second program table information may be generated in the PSI and PSIP generator 110 of the broadcast transmitting device of FIG. 2.

The broadcast transmitting device constitutes a stream including the generated broadcast stream and first and second program table information in operation S340, and then transmits the constituted stream in operation S350.

For example, the transport multiplexer 120 of the broadcast transmitting device of FIG. 2 may multiplex the generated broadcast stream and first and second program table information in order to generate a TS. Then, the generated TS may be transmitted through the DTV transmitter 140 after passing through the modulator 130.

According to an embodiment, the first program table information may include information on the TV station that transmits the stream, for example, a broadcaster ID and TV station ID.

Figure 5:
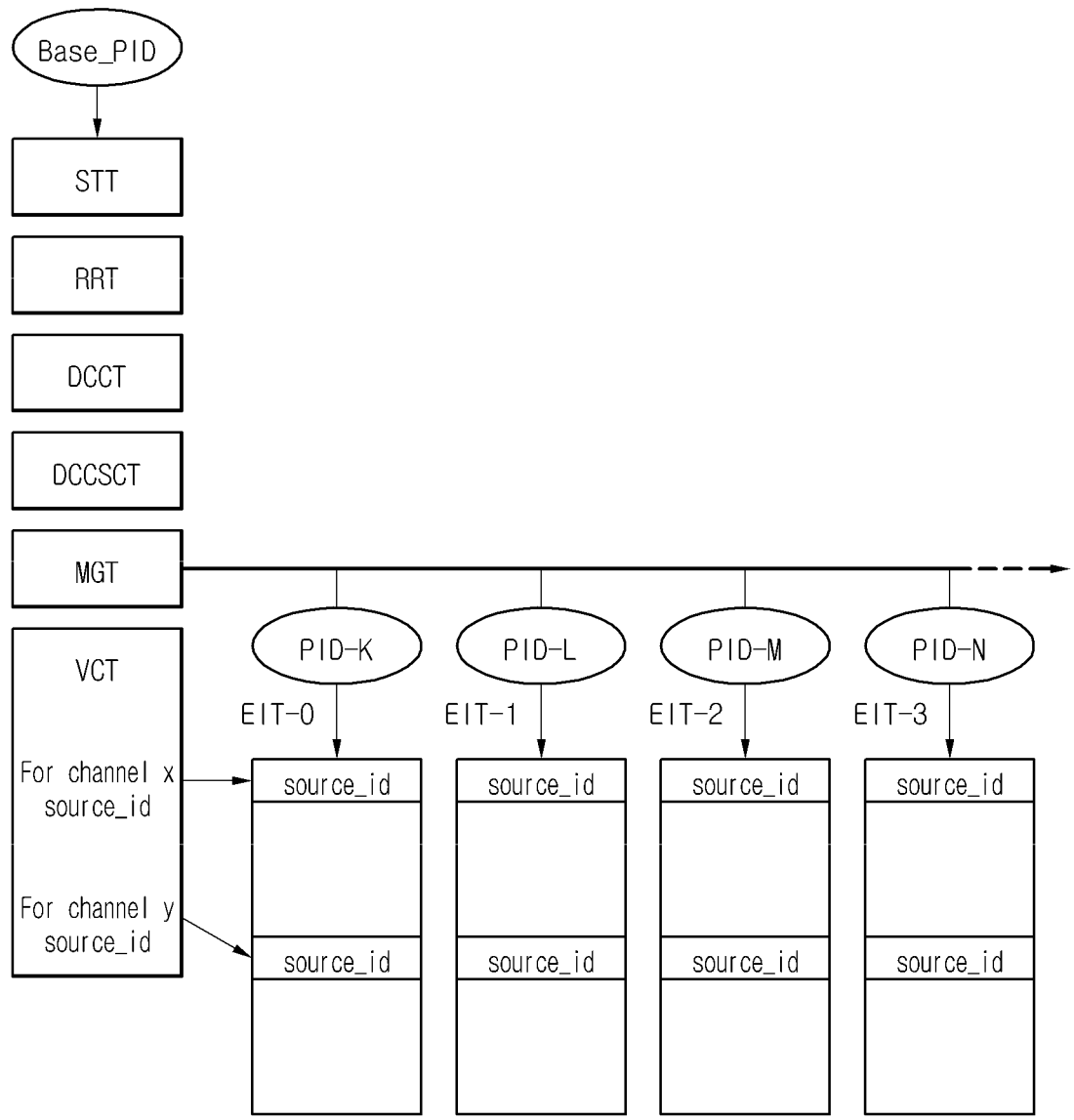
FIG. 5 is a view illustrating a configuration of program table information for RT service according to an embodiment.

FIGS. 5 to 7 are views illustrating tables including information on RT content, which is used for describing an embodiment relating to a configuration of the first program table information.

Table 1 represents tables defined using the PSIP according to the ATSC digital broadcast standard.

TABLE 1

| Table | Role |
|-------|------|
| MGT | Provide version number, size, and PID with respect to other tables |
| VCT | Provide attributes of virtual channels |
| EIT | Provide information on events of virtual channels |
| ETT | Provide detailed information on virtual channels and events |
| RRT | Provide rating information on a plurality of areas |
| STT | Provide date and time |

Referring to Table 1 and FIG. 5, the STT may provide information on current date and time and thus, may include time information necessary for application that requires synchronization.

Additionally, the RRT may provide rating information, and may define effective rating tables with respect to different regions or nations.

The MGT is a pointer for other PSIP tables, and may define a size, PID, and version number for each table.

For example, whether tables are modified may be confirmed by using the version number and PID of each table in the MGT whose Base-PID is 0xFFB, and accordingly, the modified table may be received.

Furthermore, the VCT may represent virtual channel information necessary for channel navigation and tuning, and may include two versions such as a Terrestrial Virtual Channel Table (TVCT) for terrestrial broadcasting and a Cable Virtual Channel Table (CVCT) for cable broadcasting.

For example, the VCT may include as basic information a TS ID, a channel number, a short channel name, a program number, an access controller flag, a location field for Extended Text Message (ETM), and a service type, and may consist of syntax as shown in FIG. 6.

In more detail, a broadcast channel defined in the ATSC standard may include a plurality of virtual channels in the VCT consisting of syntax as shown in FIG. 6. Accordingly, the broadcast receiving device may recognize a virtual channel in a corresponding broadcast channel when receiving the VCT. Additionally, the virtual channels are respectively separated channels, and may have different source_id for channel identification.

The EIT includes information on events (i.e., programs) for the virtual channels in the VCT, and may consist of syntax as shown in FIG. 7.

Additionally, the EIT may classify the events according to each channel by using source_id in the VCT.

Additionally, the EIT may consist of 128 tables, i.e., from EIT-0 to EIT 127 corresponding to current events, each having information on programs in a corresponding time interval of every three hours.

The ETT may include relatively long text messages for the events and virtual channels. For example, each of the VCT and EIT may include one ETT, or may not include the ETT at all.

The Directed Channel Change Table (DCCT) provides definitions for modification requests of virtual channels, and the Directed Channel Change Selection Code Table (DCCSCT) provides extension for a basic genre category and location code. The two tables DCCT and DCCSCT may be selective.

According to an embodiment, the VCT may include information on the TV station that transmits a corresponding broadcast signal, for example, a broadcaster ID and TV station ID.

FIG. 8 is a view illustrating a data allocation method of a broadcast channel according to an embodiment.

Referring to FIG. 8, a broadcast channel according to the ATSC standard is modulated through a VSB method of a 6 Mhz band, and a bandwidth of data carried on the modulating wave may be about 19.3 Mps. Moreover, the broadcast channel stream may occupy a bandwidth of about 12 Mbps to about 13 Mbps, and accordingly, 6 Mps to 7 Mps in the 19.3 Mps may be transmitted as a null packet coded with 0.

The null packet, not a payload, may be used for accurately delivering a system timer value to a section data area.

Furthermore, the null packet area of 6 Mps to 7 Mps may be used for transmitting another data in addition to a broadcast channel stream.

According to an embodiment, NRT content data provided through the NRT service may be transmitted using the remaining bandwidth of 6 Mps to 7 Mps, and for this, a Digital Storage Media-Command & Control (DSM-CC) protocol and a File Delivery over Unidirectional Transport (FLUTE) method may be used.

FIGS. 9 to 13 are views illustrating a configuration of the second program table information according to another embodiment, and representing tables including information on the NRT content.

Figure 9:
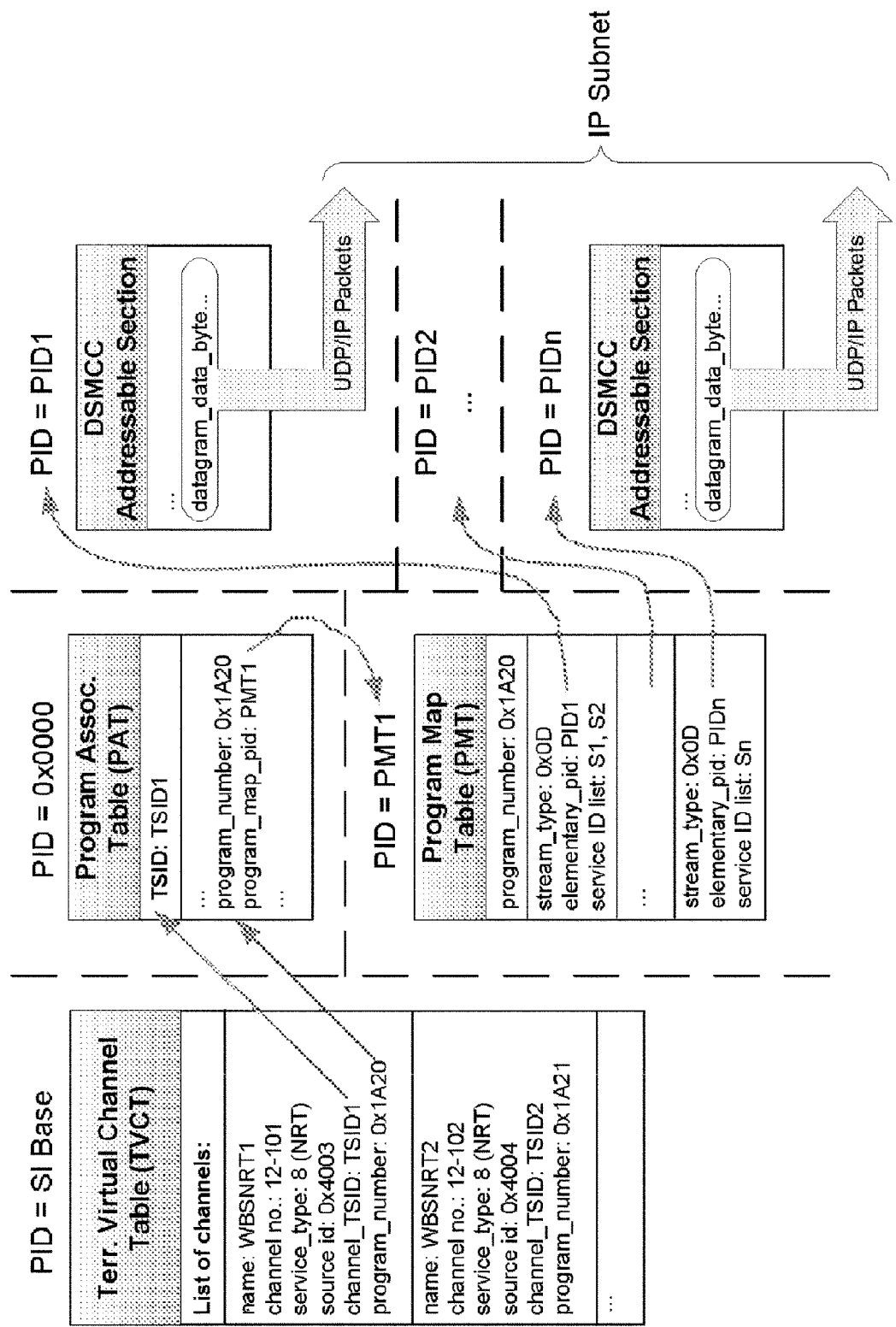
FIGS. 9 and 10 are views illustrating a configuration of program table information for NRT service according to an embodiment.

Referring to FIG. 9, a terrestrial VCT (TVCT) may provide information on virtual channels, and may include service_type representing the NRT service. For example, the NRT service delivered through an IP packet may be represented with service_type having a value of 0x08.

Moreover, the TVCT may include program_number and channel_TSID indicating information in a PAT, and the PAT may indicate a PMT through program_map_pid.

Furthermore, a TS packet corresponding to a PID elementrary_pid in the PMT may include a DSMCC Addressable Section, and may deliver an IP packet for the NRT service by using the DSMCC Addressable Section.

For example, IP packets for NRT services in one virtual channel may be delivered as TS packets that respectively correspond to a plurality of PID values, and IP packets delivered through all DSM-CC addressable sections referred from the PMT may be gathered to constitute one IP subnet.

Figure 10:
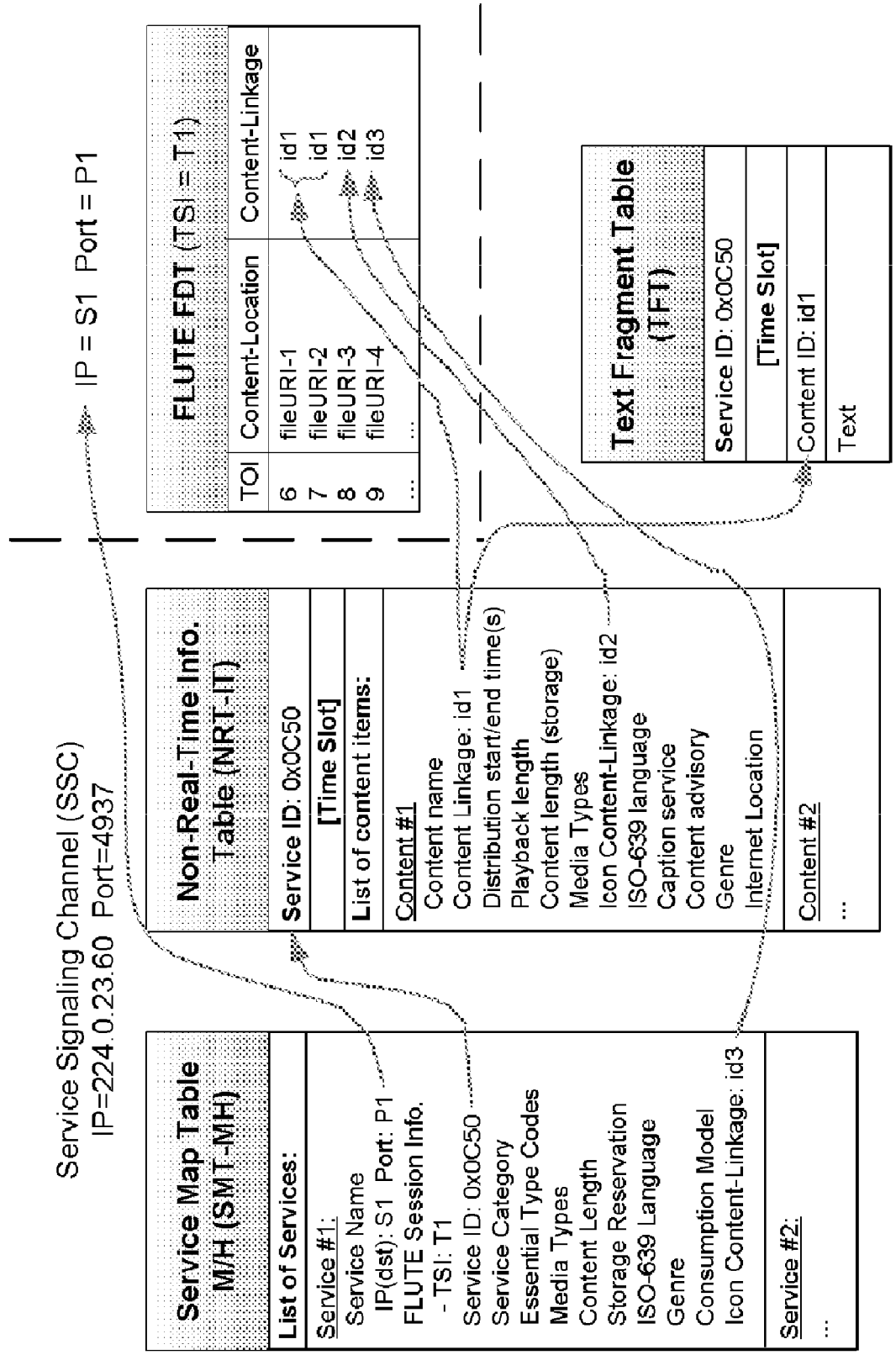

Referring to FIG. 10, for the NRT service, the program table information may include a Non-Real-Time Information Table (NRT IT), a Service Map Table (SMT), and a FLUTE File Delivery Table.

Moreover, the NRT IT may further include information on NRT contents received through the NRT service and the SMT-MH may be linked to the NRT IT by using a Service ID.

The SMT-MH may be linked to a FLUTE File Delivery Table (FDT) by using IP dst (i.e., a destination IP address), port (i.e., a port number), and a Transport Session Indicator (TSI).

According to an embodiment, IP dst and port in the SMT-MH may be 224.0.23.60:4937, i.e., a Service Signaling Channel (SSC) according to the ATSC standard.

The SMT-MH may include service-level attributes for NRT services in a TS, and for this, may consist of syntax as shown in FIGS. 11 and 12.

For example, for the NRT service, service category of the SMT-MH may be set with 0x0E.

A content linkage in the NRT IT may correspond to at least one file of the FLUTE FDT, and the FLUTE FDT may include Content-Location for each file, for example, a Uniform Resource Locator (URL).

Moreover, an icon content-linkage in the SMT-MH or NRT-IT may correspond to a file including a graphic icon in the FDT.

Additionally, it may be linked to a Text Fragment Table (TFT) by using a content linkage in the NRT-IT, and the TFT may provide text metadata for corresponding content.

FIG. 13 is a view illustrating syntax of the NRT IT.

Referring to FIG. 13, the NRT-IT may include information on RT content such as a content_name, a content_linkage, duration/expiration, playback_length, or content_length.

The configuration of the program table information for NRT service described with reference to FIGS. 9 to 13 is just one embodiment, and thus, the present invention is not limited thereto.

For example, the information on NRT service may be delivered through the following method.

Once 0x95 representing the NRT service is delivered as a stream_type to a Service Location Descriptor (SLD) in the TVCT, the broadcast receiving device recognizes that a corresponding virtual channel corresponds to the NRT service.

Additionally, Once 0x95 representing the NRT service is delivered as stream_type to a Service Location Descriptor (SLD) in the TVCT, the broadcast receiving device recognizes that a corresponding virtual channel corresponds to the NRT service.

The DST delivers additional information for providing data service, and an association tag for the NRT service may be searched by using the additional information.

The association tag is connected to one of streams of the PMT, and a stream corresponding to the PID that the one indicates may include the information on NRT service.

Furthermore, a TS packet corresponding to the PID that the association tag of the PMT indicates may include a DSMCC Addressable Section, as described with reference to FIG. 9.

According to an embodiment, the broadcast transmitting device may provide push VOD service by using the NRT service For example, the TV station 10 may receive NRT service schedule information determined according user preference from the broadcaster server 30, and generates the NRT IT in order to broadcast NRT contents in a schedule corresponding to the received service schedule information.

Figures 14, 15:
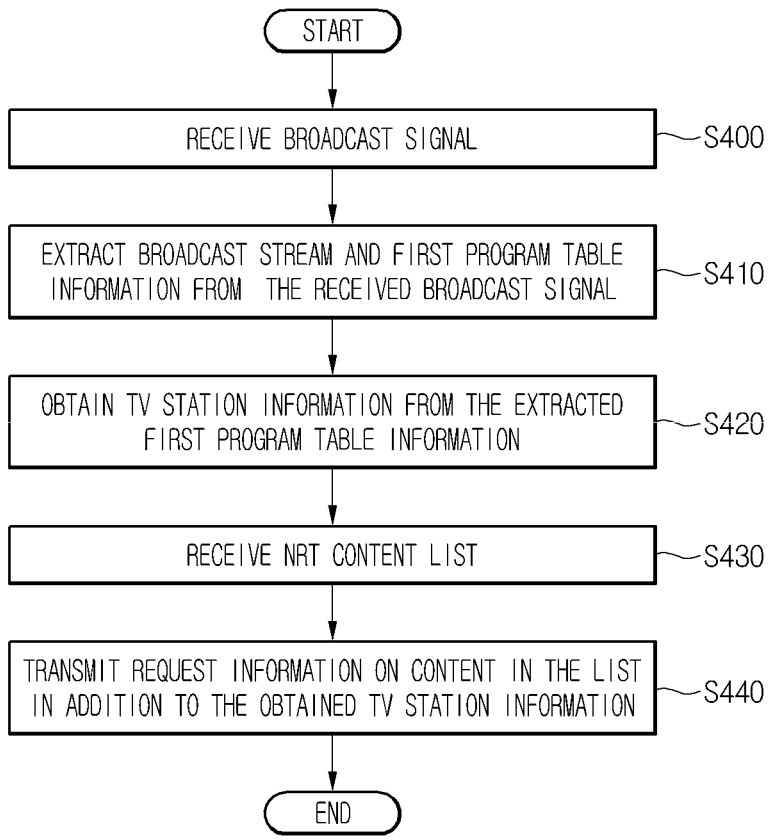
FIG. 14 is a view illustrating syntax of a descriptor providing information on a TV station according to an embodiment.
FIG. 15 is a block diagram illustrating a method of receiving a broadcast signal according to an embodiment.

FIG. 14 is a view illustrating syntax of a descriptor providing information on a TV station according to an embodiment.

One broadcaster has a plurality of TV stations according to a region, and one TV station may transmit a broadcast signal provide from a plurality of broadcasters.

Accordingly, in order to designate TV station information for a specific broadcast channel, all broadcaster information and TV station information may be provided, and a broadcast receiving device receives the broadcaster information and TV station information to confirm that a broadcast signal of a corresponding channel is received from which TV station.

Referring to FIG. 14, broadcast_information_descriptor representing TV station information may include descriptor_tag, descriptor_length, broadcater_id, and station_id.

Moreover, broadcast_information_descriptor is included in the descriptor of an VCT described with reference to FIG. 6, and thus may include information on a TV station that transmits a broadcast signal of a corresponding channel.

descriptor_tag defines a tag of a corresponding descriptor, and descriptor_length represents the length of a corresponding descriptor.

broadcater_id represents identification information on a broadcaster that provides a corresponding channel, and station_id represents identification information on a TV station that transmits a corresponding channel.

Hereinafter, a method and device of receiving a broadcast signal will be described according to an embodiment with reference to FIGS. 15 to 21.

The method of receiving a broadcast signal is obtained through inverse operations of the method of transmitting a broadcast signal described with reference to FIGS. 4 to 14, and thus overlapping descriptions will be omitted.

Figure 16:
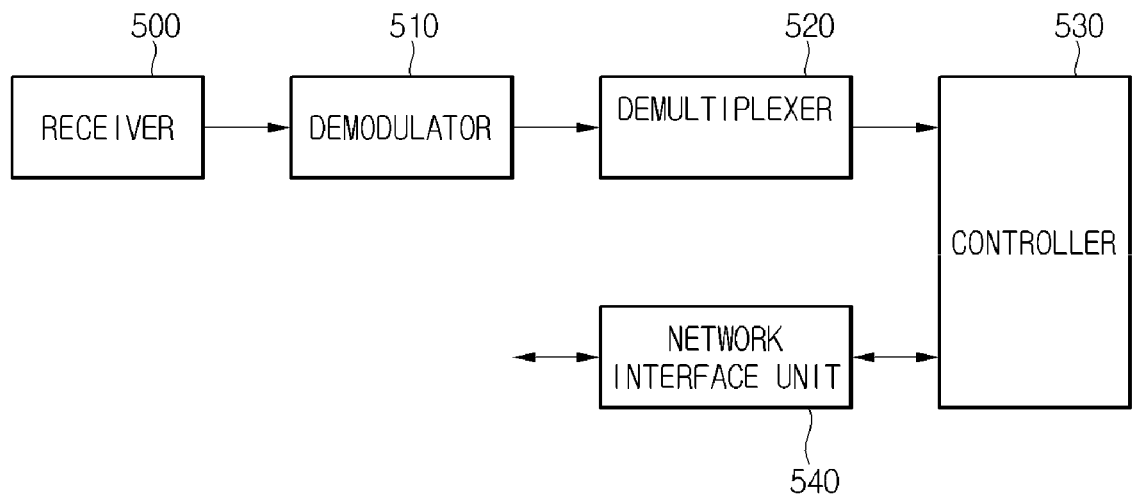
FIG. 16 is a block diagram illustrating a configuration of a broadcast signal receiving device according to a first embodiment.

FIG. 15 is a flowchart illustrating a method of receiving a broadcast signal according to a first embodiment, which will be described in linkage with a block diagram of FIG. 16 illustrating a configuration of a broadcast receiving device.

Referring to FIG. 15, a receiver 500 of the broadcast receiving device receives a broadcast signal in operation S400, and a demultiplexer 520 extracts a broadcast stream and first program table information from the received broadcast signal in operation S410.

According to an embodiment, the extracted first program table information may include a VCT described with reference to FIG. 5, and the VCT may include information on the TV station 10 that transmits the broadcast signal.

Additionally, the information on the TV station 10 consists of broadcast_information_descriptor described with reference to FIG. 14, and includes a broadcaster ID, and TV station ID. broadcast_information_descriptor may be included in the descriptor of the VCT.

Additionally, the received broadcast signal is demodulated by the demodulator 510, and then, is inputted to the demultiplexer 520. Then, a decoder (not shown) decodes the extracted program table information and outputs it to a controller 540. Then, the broadcast stream may be parsed using the extracted table information.

The controller 540 obtains TV station information from the extracted first program table information in operation S420, and a network interface unit 540 receives an NRT content list in operation S430.

For example, the network interface unit 540 of the broadcast receiving device receives the NRT content list from the broadcaster server 30 via an IP network, and the NRT content list includes information on a plurality of contents that are received from the TV station 10 through NRT service.

Moreover, a user of the broadcast receiving device may request downloading at least one content from a plurality of contents in the received NRT content list, and may also select a time that the content is to be downloaded.

Then, the network interface unit 540 of the broadcast receiving device transmits request information on a content in the list in addition to the obtained TV station information in operation S440.

For example, the network interface unit 540 may transmit the content request information and TV station information to the broadcaster server 30 via an IP network. The content request information may include identification information on a content that a user requests and information on a download request time that a user selects for the content. The TV station information may include a broadcaster ID and TV station ID.

Furthermore, the broadcaster server 30 uses the received content request information and TV station information from each of a plurality of broadcast receiving devices, and then, determines an NRT service schedule for each TV station according to user preference.

Moreover, information on the determined NRT service schedule for each TV station is transmitted to a corresponding TV station. A corresponding TV station generates an NRT IT described with reference to FIG. 13 according to the transmitted schedule information in order to broadcast contents according to the determined schedule.

According to an embodiment, a Hybrid Broadcast Broadband Television (HBBTV) method may be used as a method of controlling a broadcast receiving device by using the IP network.

In the case of the HBBTV method, a web browser is built in the broadcast receiving device. The broadcast receiving device outputs an html page in a CE-HTML suggested by CEA-2014, i.e., home network standards suggested from Consumer Electronics Association (CEA), so that operations of the broadcast receiving device may be controlled using JavaScript.

In order to support the NRT service such as Push VOD, it is necessary to control a content transmitted through NRT service in a CE-HTML page.

Table 2 illustrates how to define an interface of JavaScript used for delivering the TV station information to the broadcaster server 30 according to an embodiment.

TABLE 2

| Scripting interface | Property & Method | |
| --- | --- | --- |
| TV station | id | TV station ID |
| | isAvailable( ) | ID effectiveness |
| | refresh( ) | Receive again |
| Broadcaster | id | TV station ID |
| | isAvailable( ) | ID effectiveness |
| | refresh( ) | Receive again |

In Table 2, a TV station means a station for transmitting a terrestrial broadcast signal, and a broadcaster means a station for providing the broadcast signal.

As mentioned above, since a plurality of broadcasters may broadcast using one TV station, a broadcaster ID and TV station ID need to be combined in order to define a broadcast transmitting device, i.e., a TV station, for transmitting one broadcast channel.

According to an embodiment, as JavaScript of CE-HTML delivered from the TV station 10 operates by using the interface defined in Table 2, the DTV receiver 20, i.e., a broadcast receiving device, inquires the TV station information and transmits it to the broadcaster server 30.

The interface method and property are as follows.

id defined in Table 2 represents a TV station ID and broadcaster ID received, and is Available( ) represents whether a TV station ID and broadcaster ID are received through delivered information.

When a TV station ID and broadcaster ID need to be newly received through a channel change, refresh( ) requests retransmission of the TV station ID and broadcaster ID.

Figure 17:
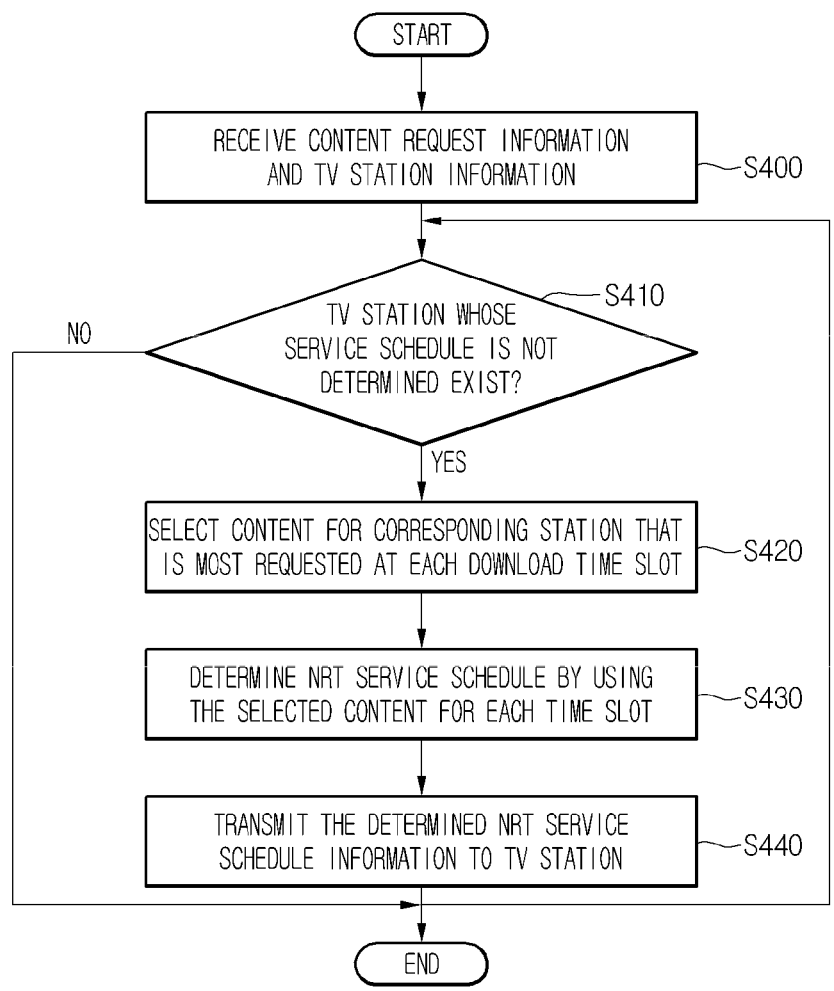
FIG. 17 is a flowchart illustrating a method of determining an NRT service schedule according to an embodiment.

FIG. 17 is a flowchart illustrating a method of determining a schedule of NRT service according to an embodiment. The embodiment relates to a method of a broadcaster server 30 to determine an NRT service schedule for each TV station by using content request information and TV station information received from a plurality of DTV receivers 20.

Referring to FIG. 17, the broadcaster server 30 receives request information and TV station information corresponding to a user's selection from a plurality of DTV receivers 20 in operation S400.

Then, the broadcaster server 30 confirms whether there is a TV station having an NRT service schedule undetermined in operation S410, and performs the following operations on each of a plurality of TV stations.

The broadcaster server 30 selects a content for a corresponding TV station that is most requested at each download time slot in operation S420, and determines an NRT service schedule by using a user preference content at the selected each download time slot in operation S430.

Referring to FIG. 18, the broadcaster server 30 receives information on the title of a content that a user requests for download and a download request time slot that a user requests for a corresponding content, from a plurality of DTV receivers 20, and then receives information on a TV station that transmits a broadcast signal in addition to the information on the title and tile slot.

The broadcaster server 30 separates the received information by each TV station, and then, selects a user preference content for each TV station that is most requested at each download request time slot.

For example, when a TV station is "100", a user preference content that is most requested at a download request time slot "00:00" is "Heroes 1-1" and a user preference content that is most requested at a download request time slot "01:00" is "Heroes 2-5".

Moreover, when a TV station is "200", a user preference content that is most requested at download request time slots "00:00" and "01:00" is "24 1-1".

The broadcaster server 30 may determine an NRT service schedule for each TV station according to a user preference content selected for each TV station and download time slot.

FIG. 19 is a view illustrating an NRT service schedule determined the information of FIG. 18 according to an embodiment.

Referring to FIG. 19, according to the determined NRT service schedule of the TV station "100", "Heroes 1-1" that is most requested by a user at a broadcast time slot "00:00" is broadcasted, and "heroes 2-5" is broadcasted at a broadcast time slot "01:00".

Additionally, according to the determined NRT service schedule of the TV station "200", "24 1-1" that is most requested by a user at a broadcast time slot "00:00" is broadcasted, and "24 1-1" is broadcasted at a broadcast time slot "01:00".

The broadcaster server 30 transmits information on the determined NRT service schedule to a corresponding TV station in operation S440.

For example, the broadcaster server 30 transmits NRT service schedule information shown in FIG. 19(a) to the TV station "100", i.e., a corresponding TV station, and transmits NRT service schedule information shown in FIG. 19(b) to the TV station "200".

Moreover, a TV station that receives the NRT service schedule information may generate an NRT IT described with reference to FIG. 13 by using the received schedule information.

For example, the TV station "100" generates an NRT IT corresponding to an NRT service schedule provided from the broadcaster server 30, as shown in FIG. 19(a), in order to transmit it to the DTV receiver 20, and then broadcasts an NRT content according the NRT service schedule.

In more detail, the TV station "100" that receives the NRT service schedule information of FIG. 19(a) from the broadcaster server 30 may generate the NRT IT in order to broadcast "Heroes 1-1" at a broadcast time slot "00:00" and "Heroes 2-5" at a broadcast time slot "01:00".

Table 3 is a view illustrating how to define an interface of JavaScript for controlling NRT service on a web browser. This may be used to confirm whether NRT service was downloaded before while JavaScript of CE-HTML delivered from the broadcaster server 30 operations.

TABLE 3

| Scripting interface | Property & Method | |
|---|---|---|
| NRTFile | getServiceIds | Inquire ID of total service |
| | serviceId | Service ID |
| | contentId | Inquire Content ID of corresponding |
| | getFileNames( ) | |
| | fileName | Service |
| | getFile( ) | Content ID |
| | getFileAs( ) | Inquire file name in corresponding |
| | getDownloadablePeriod( ) | |
| | getDownloadableChunks( ) | Content |
| | isValid( ) | File Name |
| | isDownloadable( ) | Download file |
| | FileSize | Download with given name |
| | | Inquire downloadable time |
| | | Inquire downloaded portion |
| | | Whether Service/Content/File is effective |
| | | Whether it is downloadable |
| | | File size |
| FileChunk | offset | Position of received block in File |
| | size | Size of corresponding block |

The method and property in Table 3 are defined as follows.

getServiceId of NRTFile provides a list on all service IDs in a current NRT service, and serviceId represents a service ID in the NRT service.

Additionally, getContentId provides a list on all content IDs in a corresponding NRT service, and contentId represents a content ID provided through the NRT service.

Moreover, getFileNames( ) provides all file names in a corresponding content, and filename represents a file name of the NRT service.

getFile( ) represents an operation for downloading a file through NRT service, and the downloaded file may be stored as a file name in FLUTE.

getFileAs( ) represents an operation for downloading a file through NRT service, and the downloaded file may be stored with a given name.

Furthermore, getDownloadablePeriod( ) represents a time that a corresponding content is transmitted from the TV station 10 through NRT service, and getDownloadedChunks( ) represents how much a corresponding file is downloaded. For example, when a portion of the file is downloaded, getDownloadedChunks( ) may represent a downloaded area by using an array of FileChunk.

IsValid( ) represents whether a corresponding service/content/file is displayed in an SMT, NRT IT, and FDT, and when a return value is "false", this means that there is no plan for providing a current corresponding content through NRT service.

Moreover, is Downloadable( ) represents whether a corresponding content is downloadable through NRT service, and fileSize represents the size of a corresponding content file.

Furthermore, offset of Filechunk represents the starting position of a portion that is continuously adjoined among part of a file in downloading, and size represents the size of a portion that is continuously adjoined among part of a file in downloading.

For example, if two different FileChunks are adjacent, the two FileChunks are combined into one. offset is an offset of a front FileChunk, and size is the sum of the two FileChunks.

Once all content files are downloaded through NRT service, only one FileChunk remains. In this case, offset becomes "0", and size is the size of a corresponding file.

FIG. 20 is a view illustrating script for providing NRT service according to an embodiment, which is a function for searching a status of a service/content/file by using JavaScript described with reference to Table 2.

Referring to FIG. 20, inputted serviceId, contentId, and file name are conditions for indicating one file in NRT service, and a current status of a corresponding file may be found using a method of NRTFile.

For example, it is confirmed whether a corresponding file is currently represented in NRT service through the is Valid method, and if there is no information on the corresponding file in NRT service, "No NRT Info" may be returned.

Moreover, when no information on the corresponding file is in NRT service, a broadcast receiving device may send a request for downloading a corresponding content to the broadcaster server 30 at the user's request.

Furthermore, getDownloadedChunks is information that represents how much a corresponding file is downloaded, and a returned chunks is an array of FileChunk. If the size of the array is "1" and the size of chunk is the same as that of the file, it is confirmed that the corresponding file is completely downloaded.

Additionally, if the array has a value between "0" and "1", it means that the corresponding file is in downloading, and if it has "0", it means that the corresponding file is not downloaded at all.

Figure 21:
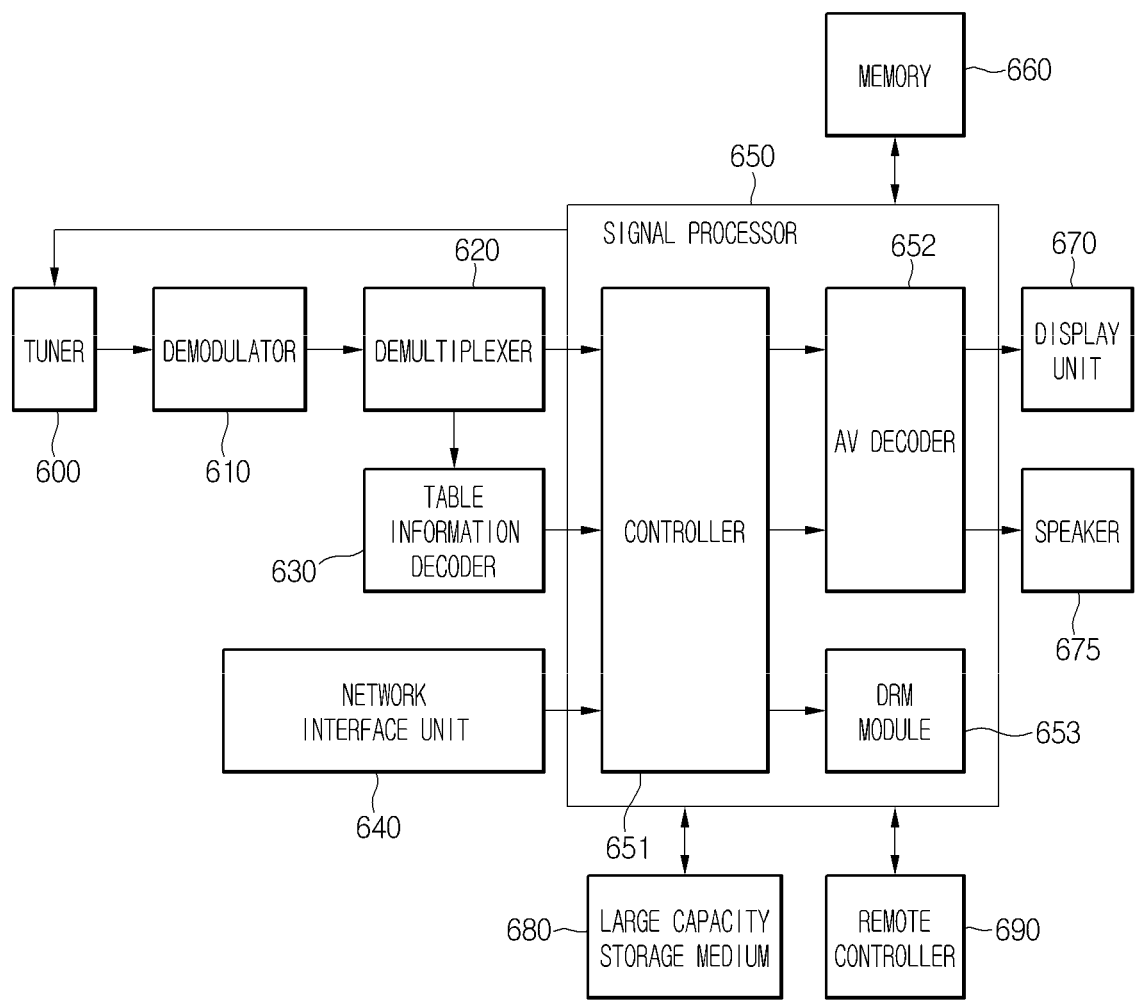
FIG. 21 is a block diagram illustrating a configuration of a broadcast signal receiving device according to a second embodiment.

FIG. 21 is a block diagram illustrating a configuration of a broadcast signal receiving device according to a second embodiment, and overlapping contents described with reference to FIGS. 3 to 16 will be omitted.

Referring to FIG. 21, a demodulator 610 demodulates a broadcast signal received though a turner 600, and a demultiplexer 620 demultiplexes a TS inputted from the demodulator 810 to extract a broadcast stream and program table information.

A table information decoder 630 decodes the extracted program table information and outputs it to a controller 651.

According to an embodiment, the extracted program table information may include a VCT including a broadcaster ID and TV station ID and an NRT IT generated in the broadcaster server 30 according to NRT service schedule information determined based on user preference.

Additionally, a network interface unit 640 may transceive data through an access to a wire/wireless network such as internet, and for example, may transmit information on a content that a user requests, in more detail, the title of a requested content and a download request time for a corresponding time, to the server 30.

For this, the network interface unit 640 may include a wireless network Phy and MAC.

A controller 650 of a signal processor 651 parses a broadcast stream inputted from the demultiplexer 620 by using the decoded first program table information, for example, a PSI and PSIP table, to output video stream and audio stream.

Additionally, the controller 651 processes content data inputted from the network interface unit 640, and output the processed content data to an AV decoder 652.

The AV decoder 652 decodes and outputs the video stream and audio stream inputted from the controller 651; a display unit 670 displays an image by using the decoded video data; and a speaker 675 outputs audio by using the audio data.

According to an embodiment, the controller 851 may obtain the decoded program table information, for example, TV station information including a broadcaster ID and TV station ID, from a VCT.

Moreover, the controller 651 may include a broadcast processor (not shown) for processing a broadcast stream inputted from the demultiplexer 620, and a broadband processor (not shown) for processing content data inputted from the network interface unit 640, and may further include a channel manager (not shown) and an application manager (not shown) beside those.

Additionally, the signal processor 650 may further include an internal memory (not shown), an internal DMR module (not shown) for communicating with an external DRM module, a PVR/Progressive download unit (not shown), and an input device (not shown).

A memory 660 may include ROM, RAM, and NVRAM, and may store the first and second program table information.

The broadcast receiving device may include a high capacity storage medium 680, and for example, the high capacity storage medium 680 may store contents received through NRT service.

Furthermore, a remote controller 690 may control an operation of the broadcast receiving device at a user's input.

Figure 22:
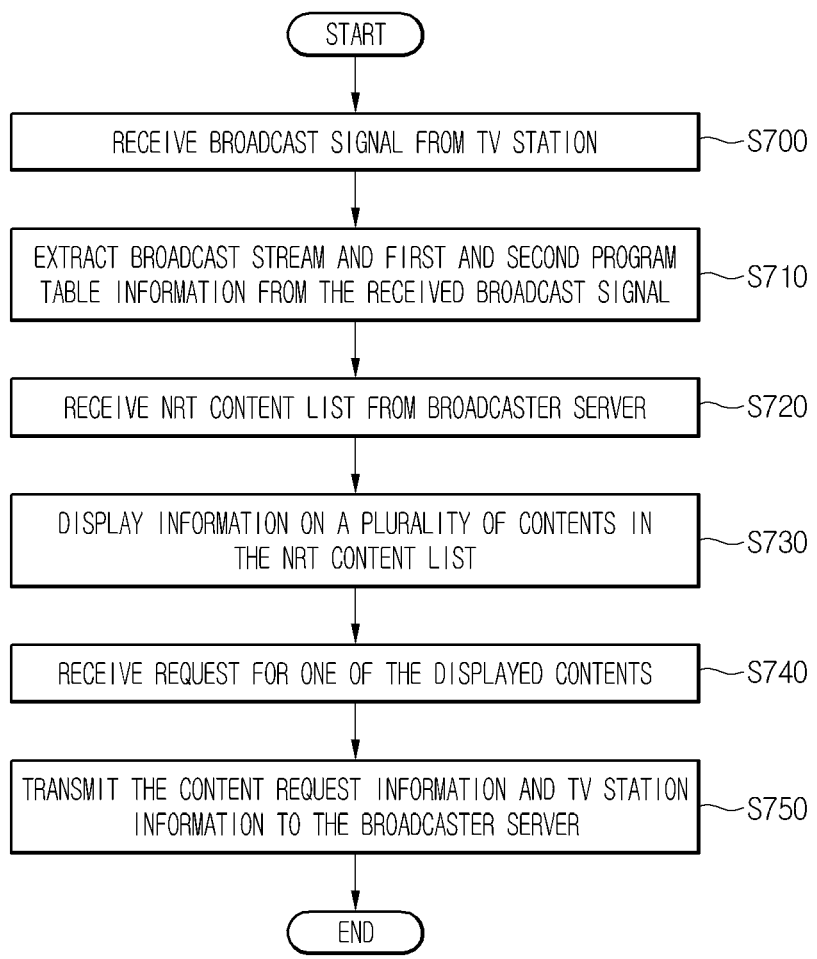
FIG. 22 is a flowchart illustrating a method of receiving a broadcast signal according to a second embodiment.

FIG. 22 is a flowchart illustrating a method of receiving a broadcast signal according to an embodiment, and overlapping contents described with reference to FIGS. 15 to 21 will be omitted.

Referring to FIG. 22, the DTV receiver 20 receives a broadcast signal from the TV station 10 in operation S700, and extracts a broadcast stream, first program table information, and second program table information, from the received broadcast signal in operation S710.

Moreover, the DTV receiver 20 receives an NRT content list from the broadcaster server 30 in operation S720, and displays information on a plurality of contents in the NRT content list in operation S730.

Then, the DTV receiver 20 receives a request for one of contents displayed in the list from a user in operation S740, and transmits information on the content request and TV station information to the broadcaster server 30 in operation S750.

Additionally, the TV station information may be obtained from the VCT in the first program table information extracted in operation S710.

Moreover, the DTV receiver 20 may configure a screen including the NRT content list by using CE-HTML transmitted from the broadcaster server 30, and may output a corresponding page according to an operation of a web browser.

Figure 23:
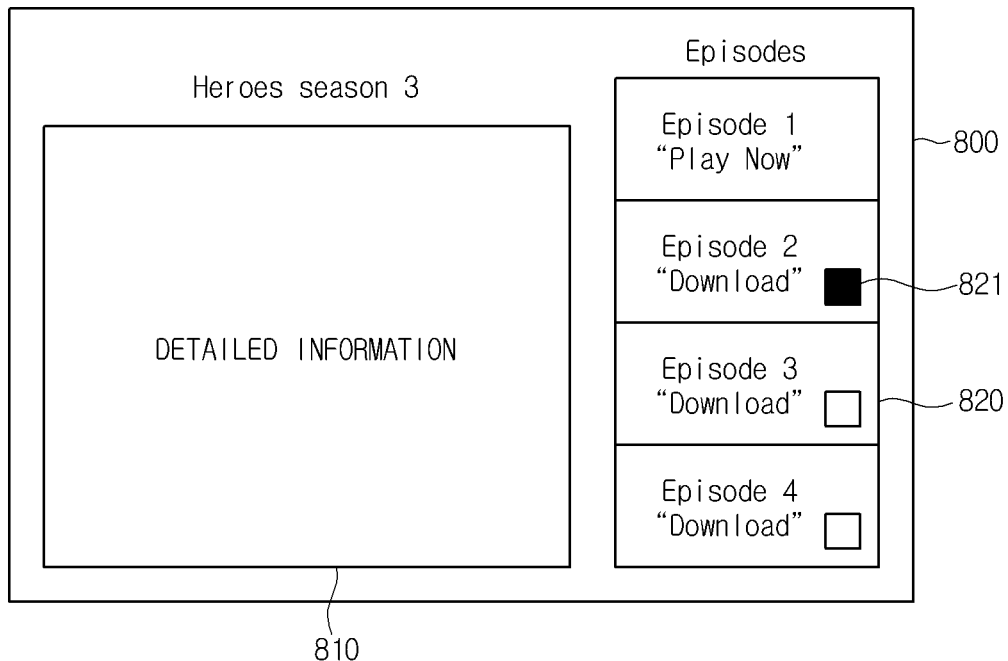
FIG. 23 is a view illustrating a method of displaying information on a plurality of contents according to a first embodiment.

Referring to FIG. 23, the DTV receiver 20 may display detailed information 810 on "Heroes season 3", i.e., a corresponding program, on a screen 800 by using an ETT, and in addition to that, a list 820 of contents provided through NRT service may be displayed.

For example, the list 820 displayed on the screen 800 may include buttons corresponding to a plurality of contents, i.e., "Episode 1", "Episode 2", "Episode 3" and "Episode 4" that are provided through push VOD service.

Additionally, a user may select one of the buttons to make a request for downloading or playing a corresponding content.

As shown in FIG. 23, "Episode 1" whose button has "Play Now" displayed is a content that is already downloaded through NRT service and stored in a large capacity storage medium, and thus, is immediately playable using the downloaded data, For example, when a user selects a button corresponding to "Episode 1", JavaScript corresponding to the selected button is executed, so that "Episode 1", i.e., a pre-stored content" may be played.

Additionally, "Episode 2", "Episode 3" and "Episode 4" displayed with "Download" except "Episode 1" are contents whose download schedule is not set, and thus, a user may select a button for "Download" to make a request for downloading a corresponding content.

Moreover, when the button having ""Download" displayed is selected, JavaScript corresponding to the selected button is executed, so that the DTV receiver 20 may transmit information on the requested content and TV station information to the broadcaster server 30.

For example, when a user selects a box 821 in the button corresponding to "Episode 2", information on the requested "Episode 2" in addition to the TV station information may be transmitted to the broadcaster server 30.

Figure 24:
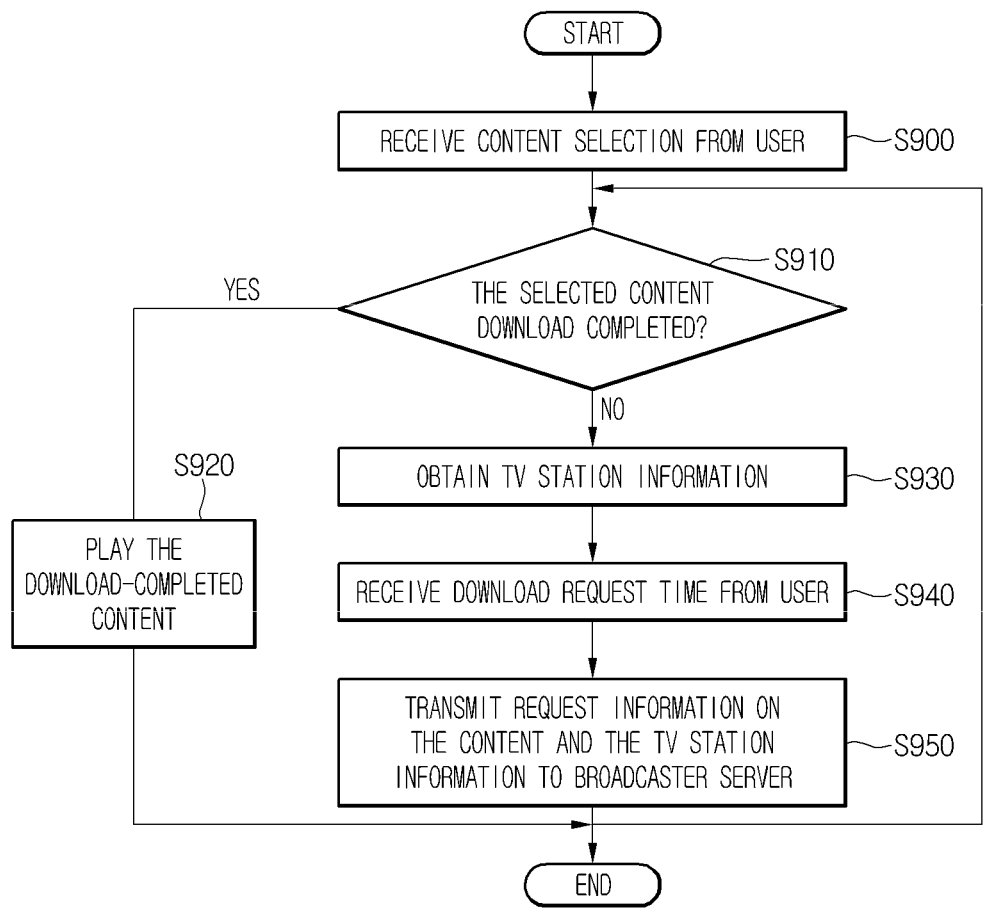
FIG. 24 is a flowchart illustrating a method of processing a content selected by a user according to an embodiment.

FIG. 24 is a flowchart illustrating a method of processing a content selected by a user, and i.e., a method of a web browser in the DTV receiver 20 to display an NRT service page written in CE-HTML, which is transmitted from the broadcaster server 30, on a screen and to operate.

Firstly, once the screen 800 is configured by CE-HTML, the DTV receiver 20 determines whether a corresponding content is completely downloaded and pre-stored in order to display information on contents, and then, displays "Play Now" on a pre-stored content, and "Download" on an unsaved content.

Referring to FIG. 24, the DTV receiver 20 receives a content selected by a user through a navigation key equipped in a remote controller in operation S900, and confirms whether the selected content is completely downloaded in operation S910.

In this case, an operating mode of the DTV receiver may be different according to a content that a user selects.

When the selected content is completely downloaded and stored, the DTV receiver 20 plays the completely-downloaded content in operation 920.

Moreover, if the selected content is not completely downloaded, TV station information is obtained by using the JavaScript in operation S930. After a user inputs a download request time for the selected content in operation S940, request information on the content and the TV station information are transmitted to the broadcaster server 30 in operation S950.

For example, the information transmitted to the broadcaster server 30 may have the configuration described with reference to FIG. 18.

FIGS. 25 and 26 are views illustrating a method of setting a download request time of a content according to an embodiment, which relates to a user interface (UI) configuration for receiving a download request time from a user in operation S940 of FIG. 24.

Referring to FIG. 25, when a user selects an "Episode 2" button having "Download" displayed from the screen 800 of FIG. 23, a time input window 830 for inputting a download request time for "Episode 2" may be displayed.

A user may input a time slot for downloading "Episode 2" in boxes 831 and 832 on the time input window 830.

According to another embodiment, an item for NRT service related setting may be added to the menu of the DTV receiver 20.

Referring to FIG. 26, when a user selects the menu of the DTV receiver 20, a menu window 840 for menu setting is displayed on the screen 800. The menu window 840 includes a "Channel" item 841 for channel setting, a "Setting" item (842) for general setting, an "NRT service" item 843 for NRT service related setting, and a "Lock" item 844 for lock setting.

Furthermore, when a user selects the "NRT service" item 843 from the menu window 840, boxes 844 and 845 for inputting the download request time are displayed, and a user may input a desired download time slot in the boxes 844 and 845 for time input.

Information on the download request time that a user inputs in addition to information on a corresponding content and TV station information may be transmitted to the broadcaster server 30.

Hereinafter, a method of configuring a push VOD service screen by using JavaScript will be described with reference to FIGS. 27 to 29.

Referring to an NRT information table shown in FIG. 27, three contents such as "Heroes Season 3_Episode 2", Heroes Season 3_Episode 3" and "Heroes Season 3_Episode 4" may be provided through current push VOD.

Figure 28:
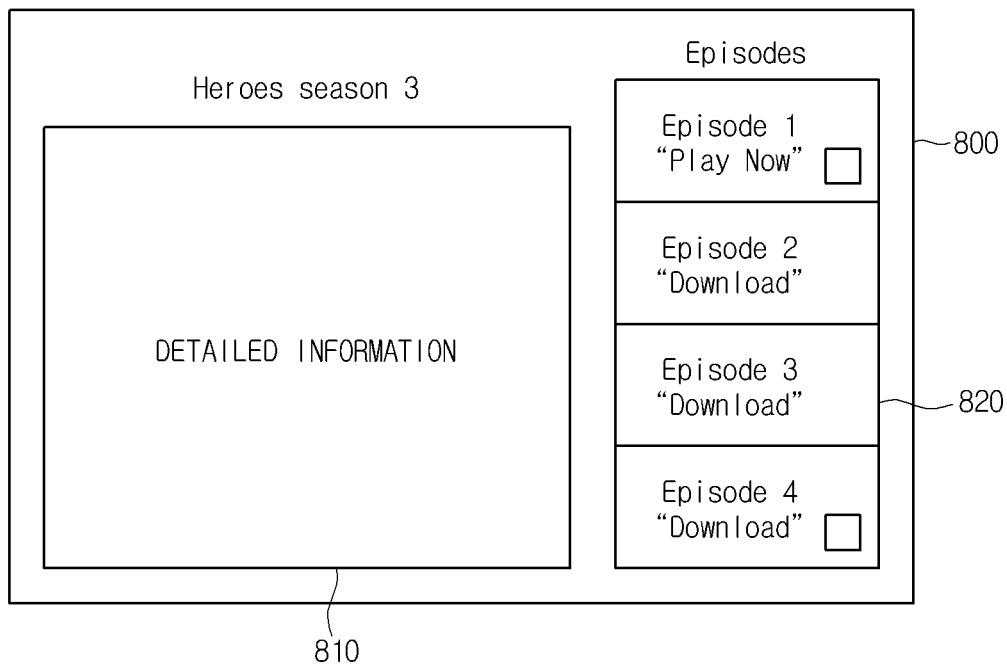
FIG. 28 is a view illustrating a method of displaying information on a plurality of contents according to a second embodiment.

Referring to FIG. 28, four contents are included in a content list 820 on a screen 800, and information on the content list 820 may be transmitted from the broadcaster server 30.

Moreover, since information on "Episode 1" among four contents in the content list 820 is not included in the NRT IT, no current push VOD service plan is available for a corresponding content.

In this case, when a user makes a request for downloading "Episode 1", the DTV receiver 20 may send a request for transmitting "Episode 1" to the broadcaster server 30, and for example, may transmit TV station information in addition to information on "Episode 1" that the user requests and information on a download request time to the broadcaster server 30.

Figure 29:
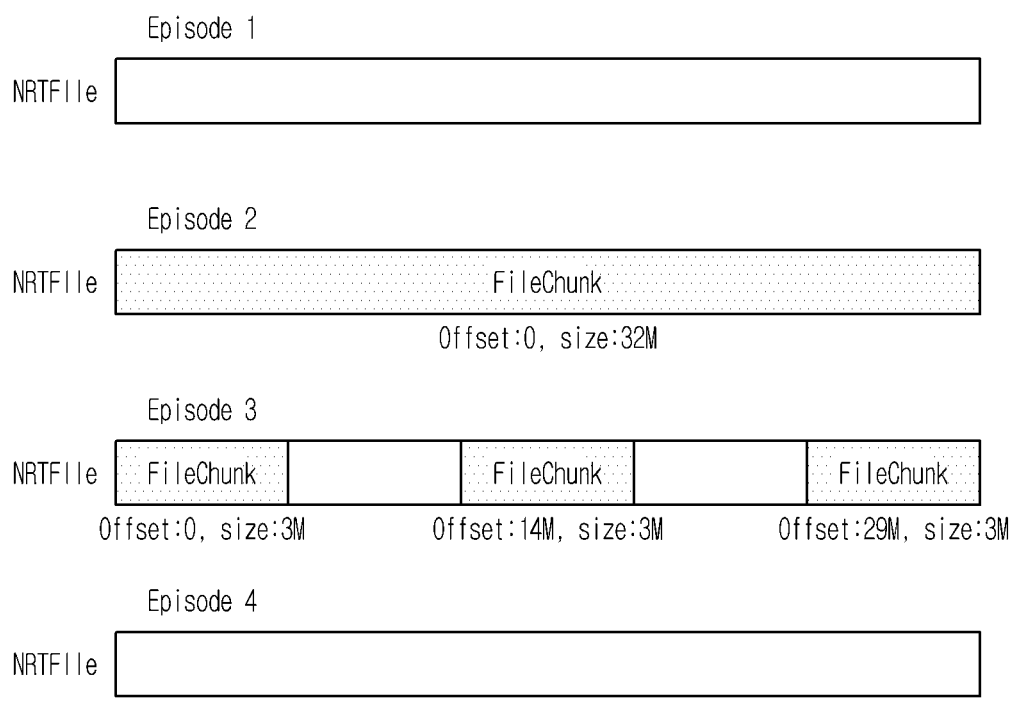
FIG. 29 is a view illustrating a download status of contents shown in FIG. 28.

Referring to FIG. 29, "Episode 2" having "Play Now" displayed is a content that is completely downloaded and thus, is immediately playable when a user selects "Episode 2".

Moreover, "Episode 3" is a content whose portion is in downloading. Since there are three FileChunks in NRTFile, it means that three parts of an entire file is being received. Accordingly, the DTV receiver 20 displays "Downloading" on the screen 800 in order to represent that "Episode 3" is in downloading.

Moreover, "Episode 4" having "Download" displayed is a content that is not downloaded yet. When a user requests a download, the DTV receiver 20 may reserve the download of "Episode 4" according to a broadcast schedule of the NRT.

Figure 30:
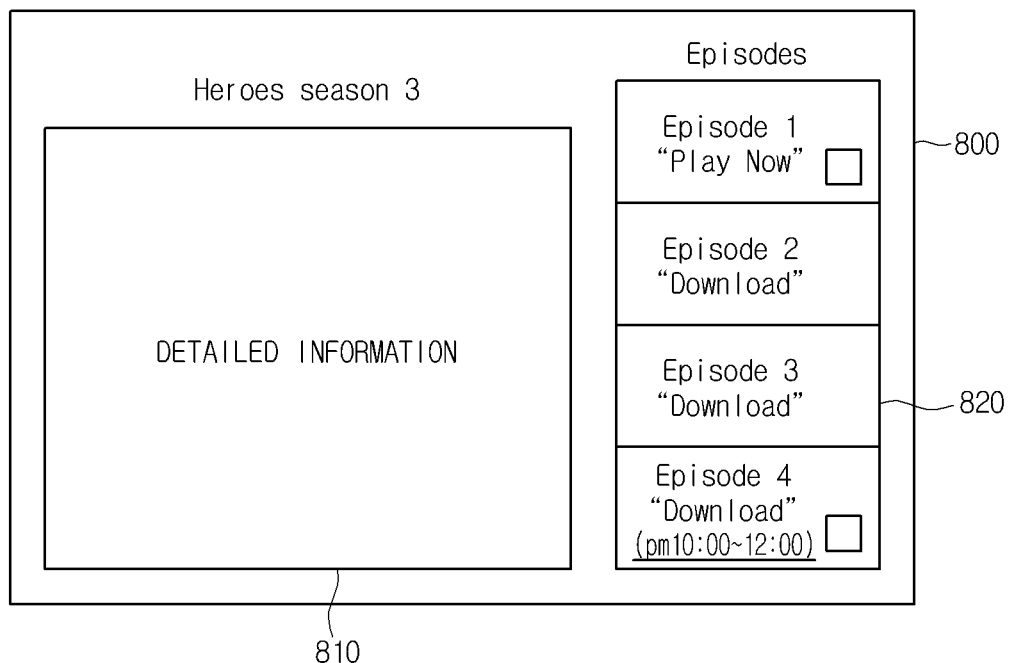
FIG. 30 is a view illustrating a method of displaying information on a plurality of contents according to a third embodiment.

Referring to FIG. 30, in the case of a content whose broadcast schedule is set according to the NRT IT, the set broadcast schedule may be displayed on the screen 800.

For example, in the case of "Episode 4" whose information in the NRT IT, "pm10:00~12:00", i.e., a broadcast schedule designated in the NRT IT, may be displayed in correspondence to "Episode 4".

Moreover, in the case of "Episode 4" whose broadcast schedule is not set, the broadcast schedule may not be displayed on the screen 800.

A broadcast signal receiving method according to an embodiment can be stored in a computer readable recording medium. Examples of the computer readable recording medium include read-only memory (ROM), random-access memory (RAM), CD-ROMs, magnetic tapes, floppy disks, and optical data storage devices.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A method of transmitting a broadcast signal through a unidirectional broadcast network, comprising:
   generating a broadcast stream including at least one program and first program table information representing the broadcast stream;
   receiving Non-Real Time (NRT) service schedule information from a broadcaster server;
   generating second program table information representing the NRT service according to the received NRT service schedule information;
   constituting a stream including the broadcast stream, the first program table information, and the second program table information; and
   transmitting the constituted stream through the unidirectional broadcast network,
   wherein the broadcaster server determines the NRT service schedule for each TV station by using content request information and TV station information transmitted from at least one broadcast receiving device.

2. The method according to claim 1, wherein the first program table information comprises a Virtual Channel Table (VCT); and
   the VCT comprises TV station information.

3. The method according to claim 2, wherein the TV station information comprises a broadcaster ID and a TV station ID.

4. The method according to claim 1, wherein the second program table information comprises an NRT information Table (NRT IT) representing information on an NRT content provided through the NRT service; and
   a broadcast schedule of an NRT content in the NRT IT is configured in correspondence to the received NRT service schedule information.

5. The method according to claim 1, wherein the content request information comprises information on a content selected by a user of the broadcast receiving device and a download request time of the content.

6. A method of receiving a broadcast signal through a unidirectional broadcast network, comprising:
   extracting a broadcast stream including at least one program and first program table information representing the broadcast stream, from the broadcast signal;
   obtaining TV station information from the extracted first program table information;
   receiving an NRT content list provided through NRT service from a broadcaster server; and
   transmitting request information on at least one content in the NRT content list in addition to the obtained TV station information,
   wherein the broadcaster server determines a NRT service schedule for each TV station by using the request information on the content and the TV station information.

7. The method according to claim 6, wherein the transmitting of the request information comprises transmitting information on a content requested by a user and a download request time of the content in addition to the TV station information to a broadcaster server.

8. The method according to claim 7, wherein the broadcaster server determines an NRT service schedule according to the transmitted request content, download request time, and TV station information.

9. The method according to claim 8, further comprising extracting second program table information representing NRT service from the broadcast signal, wherein an NRT IT in the second program table information is generated according to the NRT service schedule determined by the broadcaster server.

10. A device for receiving a broadcast signal through a unidirectional broadcast network, comprising:
    a receiver for receiving the broadcast signal through the unidirectional broadcast network;
    a demodulator for demodulating the received broadcast signal;
    a demultiplexer for extracting a broadcast stream including at least one program, first program table information representing the broadcast stream, and second program table information representing NRT service, from the demodulated broadcast signal;
    a controller for obtaining TV station information from the extracted first program table information; and
    a network interface unit for receiving an NRT content list provided through NRT service, from a broadcaster server, and transmitting request information on at least one content in the NRT content list in addition to the obtained TV station information to the broadcaster server wherein the broadcaster server determines the NRT service schedule for each TV station by using the transmitted request information on at least one content and the TV station information; and
    wherein the second program table information is generated according to the NRT service schedule determined by the broadcaster server.

11. The device according to claim 10, wherein the network interface unit transmits information on a content requested by a user among a plurality of contents in the NRT content list and a download request time of the content to the broadcaster server.

12. A method of receiving a broadcast signal through a unidirectional broadcast network, comprising:
    receiving a broadcast signal from a TV station through the unidirectional broadcast network;
    extracting a broadcast stream including at least one program, first program table information representing the broadcast stream, and second program table information representing NRT service;
    receiving an NRT content list provided through NRT service from a broadcaster server;
    displaying information on a plurality of contents in the NRT content list;
    receiving a request for at least one among the displayed contents; and
    transmitting request information on the content in addition to TV station information obtained from the first program table information to the broadcaster server,
    wherein the broadcaster server determines the NRT service schedule for each TV station by using the request information on the content and the TV station information.

13. The method according to claim 12, when the requested content is a content whose broadcast schedule is not determined, further comprising receiving a download request time for the requested content from a user.

14. The method according to claim 13, wherein the transmitting of the request information comprises transmitting information on the requested content and the inputted download request time in addition to the TV station information to the broadcaster server.

15. The method according to claim 12, wherein the displaying of the information comprises displaying the plurality of contents according to a current status by using an NRT IT in the second program table information.

16. The method according to claim 15, wherein a current status of the content is one of a status of a content not in the NRT IT, a status of a content being downloaded completely, and a status of a content whose portion is in downloading.

17. The method according to claim 16, wherein when the requested content is not in the NRT IT, information on the requested content is transmitted to the broadcaster server.

* * * * *